(12) United States Patent
Chou et al.

(10) Patent No.: US 7,496,161 B2
(45) Date of Patent: Feb. 24, 2009

(54) ADAPTIVE EQUALIZATION SYSTEM FOR A SIGNAL RECEIVER

(75) Inventors: Gerchih Chou, San Jose, CA (US); Chia-Liang Lin, Union City, CA (US)

(73) Assignee: Realtek Semiconductor Corporation, Hsinchu (TW)

( * ) Notice: Subject to any disclaimer, the term of this patent is extended or adjusted under 35 U.S.C. 154(b) by 693 days.

(21) Appl. No.: 11/186,206

(22) Filed: Jul. 20, 2005

(65) Prior Publication Data

US 2005/0271173 A1 Dec. 8, 2005

Related U.S. Application Data

(63) Continuation-in-part of application No. 10/685,560, filed on Oct. 14, 2003, now Pat. No. 7,277,516.

(60) Provisional application No. 60/668,653, filed on Apr. 5, 2005.

(51) Int. Cl.
*H04L 27/06* (2006.01)

(52) U.S. Cl. .................................. 375/344

(58) Field of Classification Search ......... 375/229–236; 333/18, 28 R; 708/300, 322, 323; 379/340, 379/398; 370/516, 518, 519, 250; 455/63.1, 455/114.2, 296

See application file for complete search history.

(56) References Cited

U.S. PATENT DOCUMENTS

| 5,103,466 | A | * | 4/1992 | Bazes | ......................... 375/361 |
| 5,991,339 | A | * | 11/1999 | Bazes et al. | .................. 375/232 |
| 6,088,415 | A | | 7/2000 | Gaudet | |
| 6,411,145 | B1 | | 6/2002 | Kueng et al. | |
| 2005/0078780 | A1 | | 4/2005 | Chou et al. | |

* cited by examiner

*Primary Examiner*—Sam K Ahn
(74) *Attorney, Agent, or Firm*—Okamoto & Benedicto LLP

(57) ABSTRACT

In one embodiment, a communication receiver includes an adaptive filter, a clock and data recovery (CDR) unit, and an adaptation control unit. The adaptive filter equalizes an input signal received over a communication channel to generate a compensated signal. The CDR unit processes the compensated signal to generate a sampling clock signal, a data signal, and a transition signal, the transition signal comprising samples of the compensated signal taken at an edge of the sampling clock signal, the data signal comprising data recovered from the input signal. The adaptation control unit receives the sampling clock signal, data signal, and transition signal and uses them to generate a control signal. The control signal may be used to control a gain of an amplifier in the adaptive filter to equalize the input signal. The adaptive filter, CDR unit, and adaptation control unit may be implemented using electrical circuits disclosed herein.

19 Claims, 14 Drawing Sheets

ADAPTIVE EQUALIZATION SYSTEM FOR A SIGNAL RECEIVER

REFERENCES TO RELATED APPLICATIONS

This application claims the benefit of U.S. Provisional Application No. 60/668,653, filed on Apr. 5, 2005.

This application is a continuation-in-part of U.S. application Ser. No. 10/685,560, filed on Oct. 14, 2003 now U.S. Pat. No. 7,277,516.

The above-mentioned provisional and regular applications are both incorporated herein by reference in their entirety.

BACKGROUND OF THE INVENTION

1. Field of the Invention

The present invention relates generally to communication systems and more particularly, but not exclusively, to an adaptive equalization system for a signal receiver.

2. Description of Related Art

Binary signal can represent digital data sequences in various ways. For example, a typical non-return to zero (NRZ) transmitter transmits a signal representing a digital data sequence using a high (positive) level to represent a digital "1" data bit and a low (negative) level to represent a "0" data bit. FIG. 1 depicts an NRZ waveform VX organized into a succession of high or low voltage levels ("symbols") wherein each symbol represents a separate bit of a data sequence, in this example the sequence {1001011001001101}. A sequence of symbols in a binary signal can represent a bit sequence in other ways. For example in a "non-return to zero inverted" (NRZI) signal each symbol corresponds to a separate bit of a data sequence, but rather than indicating the state of its corresponding bit, each symbol indicates whether its corresponding bit has the same state as a preceding bit of the sequence. A high voltage level symbol (H) indicates that the corresponding bit has the same state as its preceding bit and a low voltage level symbol (L) indicates that its corresponding bit's state differs from a preceding bit's state. Thus, an NRZI signal would represent the sequence {1001011001001101} by the symbol sequence {HLHLLLHLHLLHLHLL}.

While a transmitter may transmit a binary signal looking like signal VX, a communication channel (such as, for example a cable or a transmission line) conveying that signal to a receiver will distort the signal. A communication channel typically acts like a low-pass filter attenuating a signal's high frequency components more than its low frequency components. While transmitted signal VX departing a transmitter exhibits relatively sharp transitions between 1 and 0 symbols as illustrated in FIG. 1, the channel will smooth those sharp transitions as it delivers the signal to a receiver. Hence, a receiver might receive a signal looking for example like waveform VR of FIG. 1 rather than like the transmitted signal VX. This type of channel distortion is known as "intersymbol interference" (ISI) because states of more than one symbol can affect the voltage of the received signal VR at any given time. All NRZ, NRZI and other types of digital signals are susceptible to ISI interference.

When ISI distortion is severe, a receiver would not be able to directly recover the symbol sequence represented by transmitted signal VX simply by digitizing received signal VR. A receiver should therefore include an equalization system for processing received signal VR to compensate for ISI distortion. For example, waveform X of FIG. 1 illustrates an equalized version of the received signal VR wherein the effects of ISI distortion are substantially reduced. Note that a receiver could sample compensated signal X on each leading edge of a sampling clock CLK having an appropriate phase and frequency to produce an output signal Z conveying the same symbol sequence as VX.

FIG. 2 illustrates a transmitter 6 transmitting signal VX through a channel 8 forwarding an ISI distorted version VR of the transmitted signal to a receiver 10. Receiver 10 employs a typical prior art "adaptive feed-forward" equalization system including a filter 12 for processing signal VR to produce a compensated signal X. A clock and data recovery (CDR) unit 14 periodically samples signal X to produce an output data signal Z conveying a sequence of symbols matching that of transmitted signal VX. CDR unit 14 automatically generates the sampling clock signal CLK controlling the phase and frequency with which it samples signal X and supplies both the data signal and the clock signal CLK as outputs.

Since ISI distortion occurs because the channel 8 acts like a low pass filter, filter 12 high-pass filters the VR signal to compensate for the ISI distortion. An adaptation control unit 16 supplies a control signal C to filter 12 for adjusting the filter's frequency response so that it provides an appropriate level of equalization. CDR circuit 14 generates a "jitter estimate" signal J indicating how well filter 12 compensates the VR signal for ISI distortion. As compensation improves, the average amplitude of J decreases. Adaptation control circuit 16 therefore adjusts control signal C to minimize the average magnitude of signal J, thereby optimizing the equalization provided by filter 12.

FIG. 3 illustrates CDR unit 14 of FIG. 2 in more detailed block diagram form. A latch 18 samples signal X on leading edges of the CLK signal to produce a signal Y, and a latch 20 samples signal Y on trailing edges of the CLK signal to produce the data signal Z. An XOR gate 22 receiving the X, Y signals generates a signal U, and an XOR gate 24 receiving the Y and Z signal generates a signal D. A summer 26 offsets U by D to provide a signal E representing an error in the phase of sampling clock signal CLK relative to its ideal sampling phase. A low pass filter 27 filters error signal E to supply a control voltage input VC to a voltage-controlled oscillator (VCO) 28 producing sampling clock signal CLK. Signal VC also controls a delay circuit 30 for delaying signal U by one half cycle of the CLK signal to produce a signal U'. An XOR gate 32 receiving signals U' and D generates jitter estimate signal J.

FIG. 4 is a timing diagram illustrating behavior of various signals of CDR unit 14 of FIG. 3 when rising edges of the CLK signal arrive at latch 18 of FIG. 3 too early, ahead of the middle of symbols of signal X. Timing diagram FIG. 5 illustrates behavior of the same signals when edges of sampling clock signal CLK arrive at latch 18 too late, after the middle of symbols represented by signal X. Referring to FIGS. 4 and 5, pulses of signals U and D occur after each symbol transition in signal X, but while D signal pulses always have a 50% duty cycle, U signal pulses will have a less than 50% duty cycle when CLK signal edges occur too soon, as illustrated in FIG. 4, and will have a greater than 50% duty cycle as illustrated in FIG. 5 when sampling clock signal edges occur too late. The average voltage of error signal E, the difference between U and D signal voltages, will therefore be positive when clock signal edges arrive too soon and will be negative when clock signal edges arrive too late. Low pass filter 27 and VCO 28 adjust the sampling clock signal phase to keep the average voltage of signal E as close to zero as possible, thereby keeping the sampling clock signal phase as close as possible to ideal.

When sampling clock signal CLK has the ideal sampling phase, and signal X is perfectly equalized, rising edges of the sampling clock signal occur at the middle of signal X symbols and signals D and U' are identical. Since signal J is the exclusive OR of signals D and U', signal J remains continuously low. However when equalization is less than perfect, levels of signals D and U' will differ at times, the average magnitude of jitter estimate signal J will be non-zero and it will increase with the equalization error. Adaptation control unit 16 of FIG. 2 therefore continuously monitors jitter estimate signal J and adjusts the control input C to filter 12 to set the level of filter 12 provides to minimize the average magnitude of signal J.

Although adaptation control unit 16 and filter 12 can substantially compensate for ISI distortion, channel noise and the feedback through adaptation control unit will cause signal X to exhibit some amount of jitter. FIG. 6 includes an "eye diagram" of a poorly equalized signal X showing the range of magnitudes signal X could exhibit when monitored by an oscilloscope clocked by the CLK signal. FIG. 7 illustrates a better-equalized signal X exhibiting less jitter. The average amplitude of jitter estimate signal J is proportional to the amount of jitter in signal X relative to sampling clock signal CLK.

A typical high-pass filter 12 implements the following s-domain transfer function:

$$H(s)=(s+z)/(s+p)$$

including a single zero z and a single pole p. Adaptation control unit 16 may adjust zero z and/or pole p to minimize jitter. For example, an adaptation control unit that adjusts only zero z will slowly increase the magnitude of z until the average magnitude of jitter estimate signal J starts to increase and then slowly decrease z until the average magnitude of J begins to increase. Such a feedback control system will cause pole z to oscillate slightly about a value that minimizes the average magnitude of jitter estimate signal J, thereby ensuring that filter 12 provides an appropriate level of equalization.

FIG. 8 illustrates a transmitter 6 transmitting a signal through a channel 8 to a prior art receiver 34 employing an "adaptive feedback" equalization system. Receiver 34 includes a summing amplifier 38 for offsetting the received signal VR by an offset signal A to produce an equalized signal X. A CDR unit 40 generates sampling clock CLK, digitizes signal X using the sampling clock as a timing reference to produce an output data signal Z and generates an error estimate signal J. An adaptation control unit 42 processes the error estimate signal J to supply a compensation control signal C to a filter 44. Filter 44 filters output signal Z with a frequency response controlled by signal C to produce the compensation signal A input to summing amplifier 38. CDR unit 40 and adaptation control circuit 42 can be similar to CDR unit 14 and adaptation control unit 16 of FIG. 2, but while filter 12 of FIG. 2 is a high pass filter, filter 44 of FIG. 8 is a low pass filter.

One drawback to the adaptive equalization systems employed by the receivers of FIGS. 2 and 8 is that the circuitry needed to generate a jitter estimate signal J can be costly. What is needed is an equalization system for a signal receiver that does not require a jitter estimate signal.

BRIEF SUMMARY OF THE INVENTION

In one embodiment, a communication receiver includes an adaptive filter, a clock and data recovery (CDR) unit, and an adaptation control unit. The adaptive filter equalizes an input signal received over a communication channel to generate a compensated signal. The CRD unit receives the compensated signal to generate a sampling clock signal, a data signal, and a transition signal, the transition signal comprising samples of the compensated signal taken at an edge of the sampling clock signal, the data signal comprising data recovered from the input signal. The adaptation control unit processes the sampling clock signal, data signal, and transition signal and uses them to generate a control signal. The control signal may be used to control a gain of an amplifier in the adaptive filter to equalize the input signal. The adaptive filter, CDR unit, and adaptation control unit may be implemented using electrical circuits disclosed herein.

These and other features of the present invention will be apparent to one of ordinary skill in the art after reading the entirety of this disclosure, which includes the provided drawings and claims.

The use of the same reference label in different drawings indicates the same or like components.

DETAILED DESCRIPTION OF THE INVENTION

The present invention relates to an adaptive equalization system for a signal receiver. While the specification describes exemplary embodiments of the invention considered best modes of practicing the invention, the invention need not be limited to the exemplary embodiments described below. Those of skill in the art will appreciate that other modes of practicing the invention are possible.

Adaptive Feed-Forward Equalization

Figure 1:
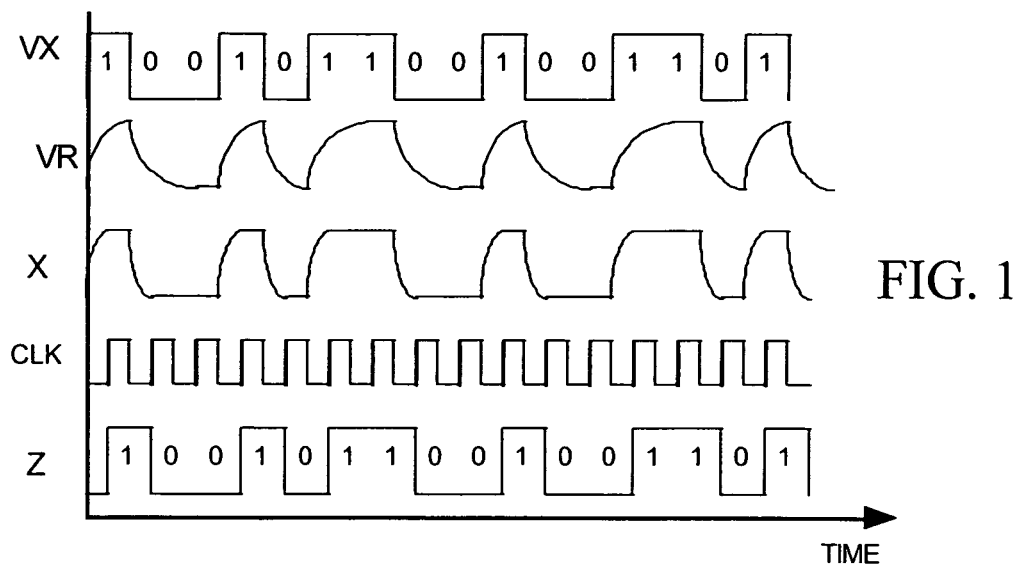
FIG. 1 is a timing diagram illustrating various waveforms generated by a system for transmitting and receiving a signal through a communication channel.
Figure 9A:
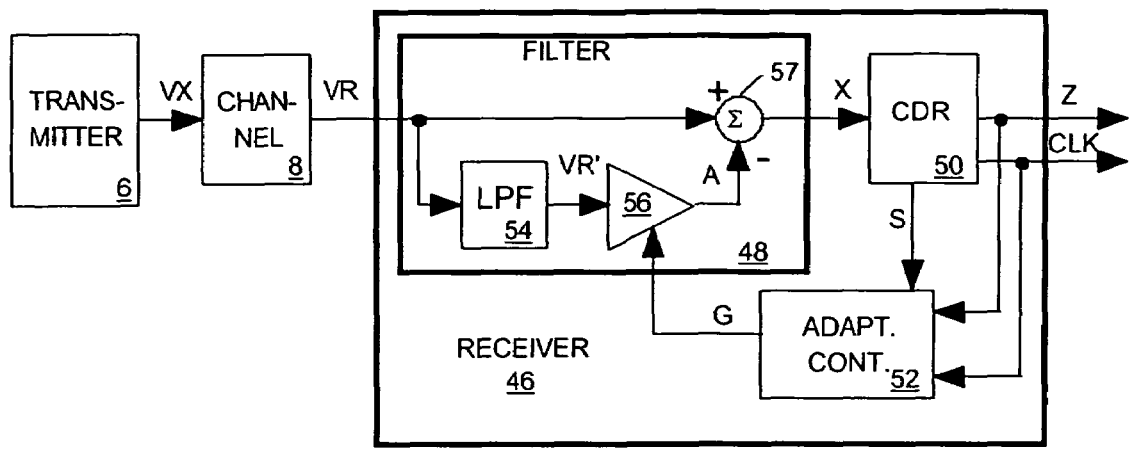
FIG. 9, which consists of FIGS. 9A-9C, illustrates in block diagram form alternative exemplary embodiments of a communication system including a receiver employing an adaptive feed-forward equalization system in accordance with embodiments of the present invention.

FIG. 9A depicts a communication system including a transmitter 6 for transmitting a digital signal VX to a communication channel 8 delivering a distorted version VR of transmitted signal VX as input to a receiver 46 in accordance with an embodiment of the present invention. As illustrated in FIG. 1, transmitted signal VX includes a succession of data cycles of uniform duration and during each data cycle, the VX signal may be of a high or low voltage level. The pattern of high and low voltage levels ("symbols") represents a data sequence. For example, transmitted signal VX could be a non-return to zero (NRZ) signal or a non-return to zero inverted (NRZI) signal. Communication channel 47 can distort received signal VR in several ways, for example, by attenuating, offsetting or filtering transmitted signal VX. In one embodiment, a receiver 46 employs an equalization system to compensate the VR signal for the type of distortion channel 8 causes when it low-pass filters the transmitted signal VX. For simplicity of illustration, FIG. 9 (i.e. FIGS. 9A, 9B, 9C) depicts receiver 46 as compensating only for this type of channel distortion, but those of skill in the art will appreciate that, when necessary, receiver 46 could be adapted to include conventional systems, such as for example an automatic gain control circuit or a baseline wander correction system, for compensating for other kinds of signal distortion.

FIG. 1 compares an example transmitted signal VX to a corresponding received signal VR when channel 8 low-pass filters the transmitted signal to produce the received signal. Note that while level transitions in the VX signal are relatively abrupt, they occur so slowly in the VR signal that received VR signal will often fail to reach an appropriate logic level following a state transition in transmitted signal VX. We call this type of channel distortion "intersymbol interference" (ISI) because more than one symbol of transmitted signal VX can influence the voltage of received signal VR at any time.

Figure 2:
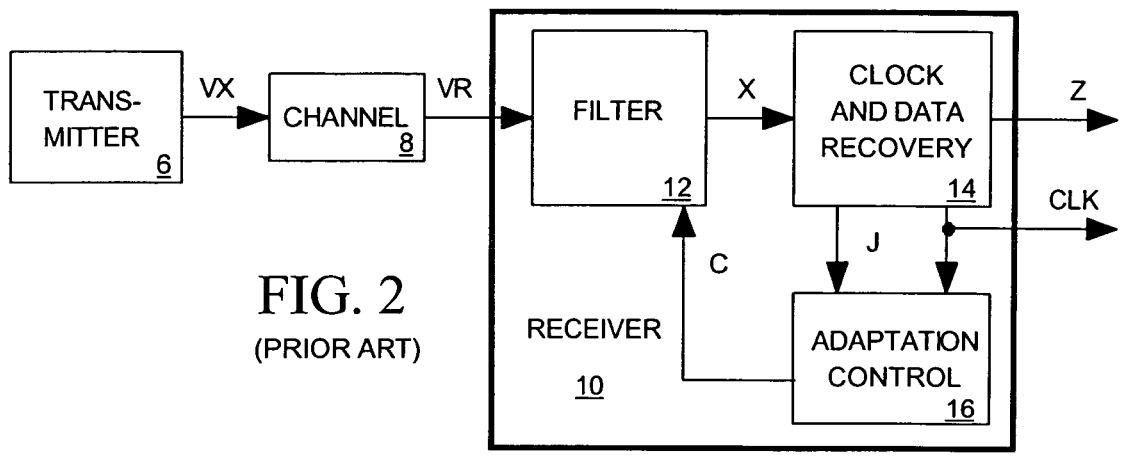
FIG. 2 illustrates a prior art communication system in block diagram form.
Figure 3:
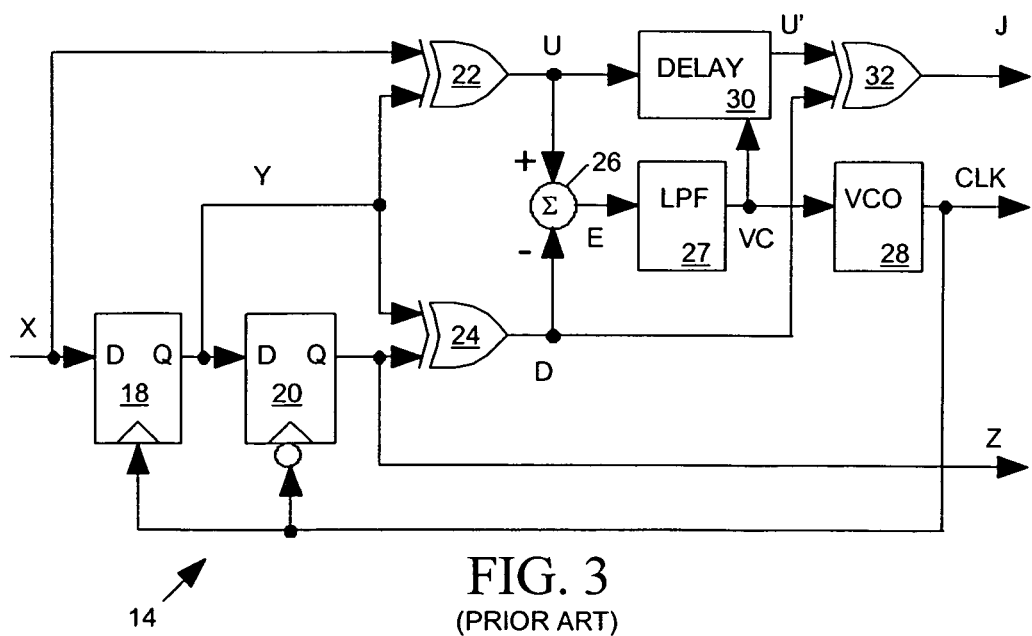
FIG. 3 illustrates the CRD unit of FIG. 2 in more detailed block diagram form.
Figure 4:
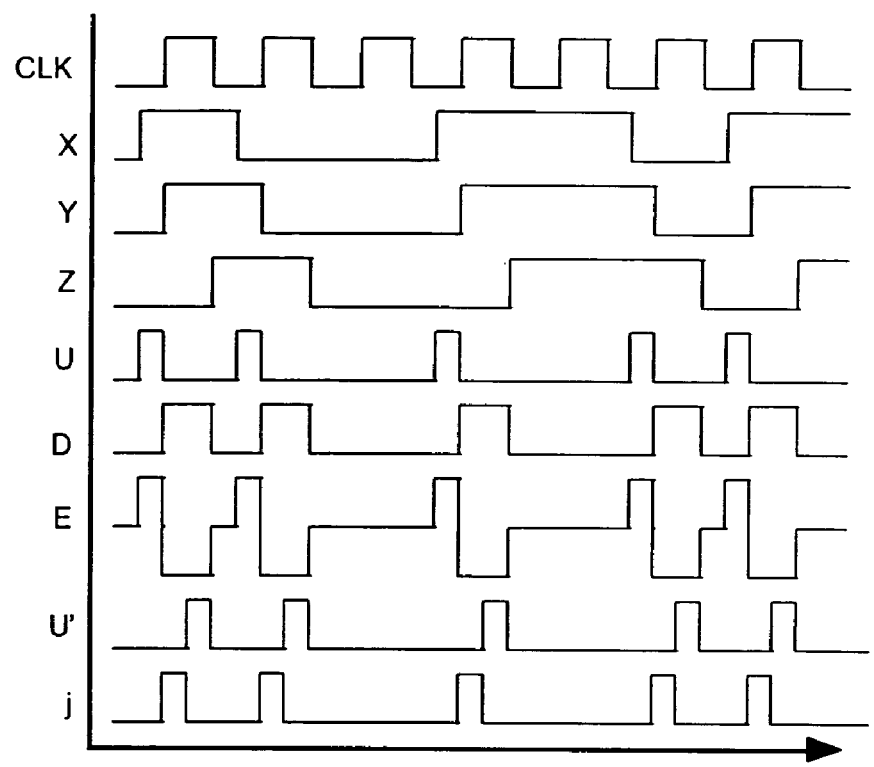
FIGS. 4-7 are timing diagrams illustrating behavior of signals produced by the CDR unit of FIG. 2.
Figure 5:
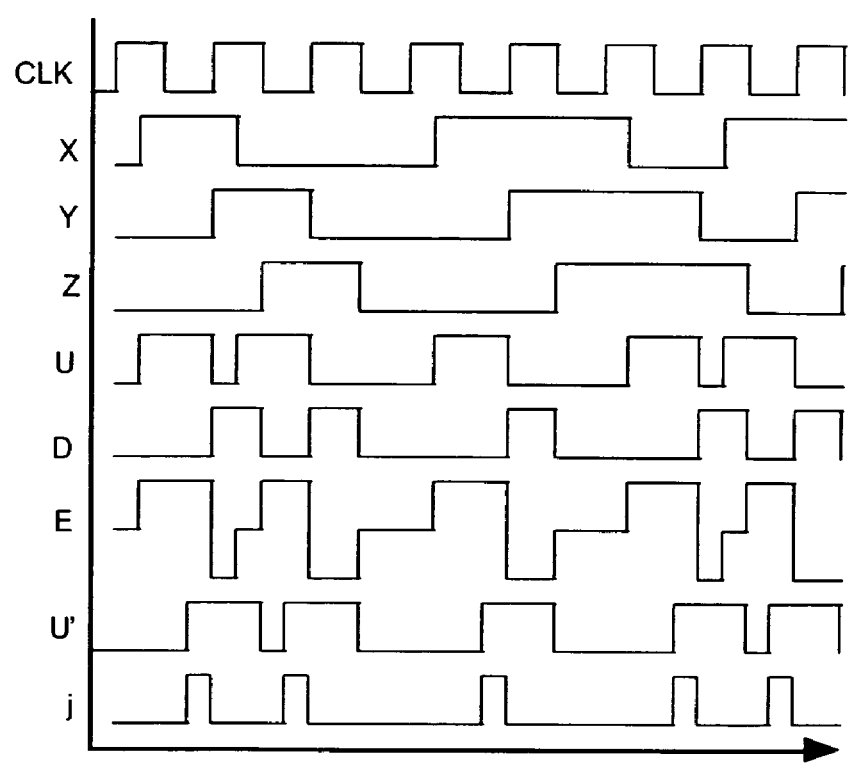
Figure 6:
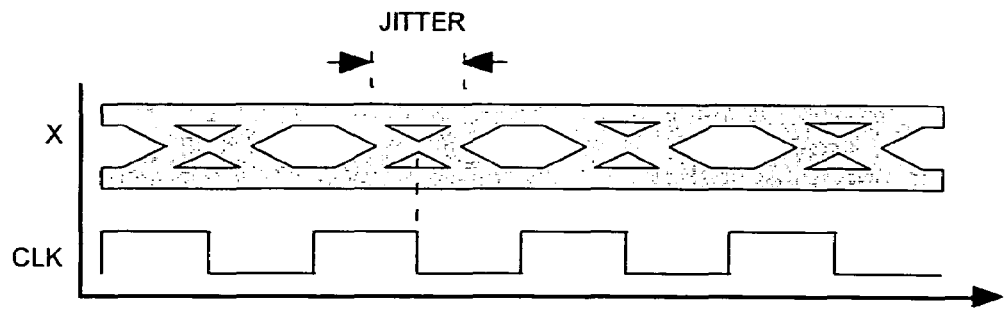
Figure 7:
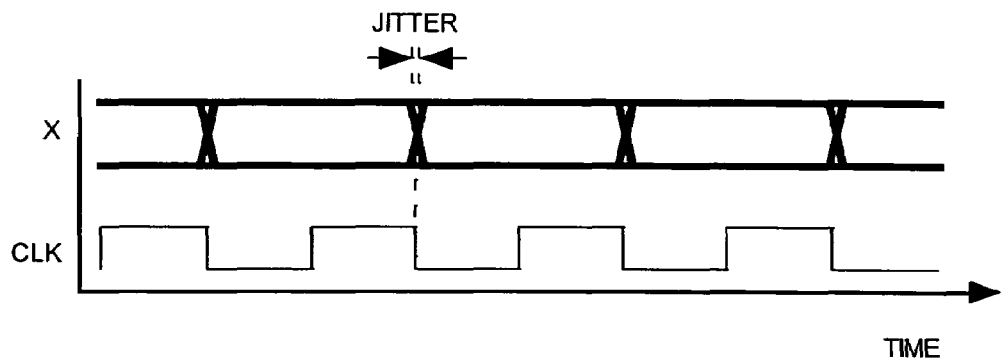
Figure 8:
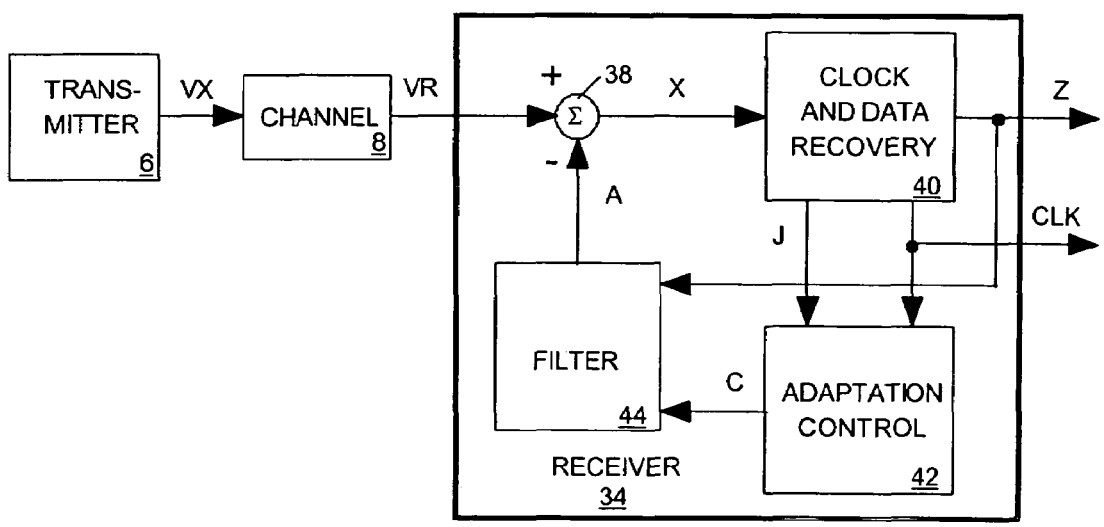
FIG. 8 illustrates another prior art communication system in block diagram form.

When ISI distortion is sufficiently large, some symbols of the VR signal can be so distorted that it is not possible to directly digitize that signal to recover the symbol sequence of transmitted VX signal. Receiver 46 therefore includes an adaptive filter 48 for filtering the received VR signal to compensate for the low-pass filtering effect of channel 8, thereby producing a compensated signal X having somewhat more abrupt transitions than the received VX signal. Note that compensated signal X looks more like transmitted signal VX than received signal VR and that it would be possible to determine the symbol sequence conveyed by the transmitted signal VX by sampling compensated signal X on each leading edge of a sampling clock signal CLK depicted in FIG. 2.

A clock and data recovery (CDR) unit 50 therefore processes signal X to generate a 50% duty cycle sampling clock signal CLK having plurality of successive cycles of substantially uniform duration wherein each leading edge of the sampling clock signal occurs at a start of each sampling clock signal cycle and each trailing edge of the sampling clock occurs substantially midway through each sampling clock signal cycle. CDR unit 50 adjusts the phase and frequency of sampling clock signal CLK so that trailing edges of the sampling clock signal occur when compensated signal X is transitioning between states, thereby ensuring that by sampling compensated signal X on each leading edge of the sampling clock signal, CDR unit 50 can produce an output first data signal Z having a succession of states representing the succession of symbols conveyed by transmitted signal VX. In the examples provided herein, each rising edge of sampling clock signal CLK is treated as a "leading" edge and each falling edge is treated as a "trailing" edge of the sampling clock signal. However, those of skill in the art will appreciate that clock signal polarity is a matter of design choice and that in alternative embodiments of the invention, falling edges may be treated as leading edges and rising edges may be treated as trailing edges.

CDR unit 50 samples compensated signal X on each trailing edge of sampling clock signal CLK to produce a second data signal S having a succession of states representing the polarity of the compensated signal X on each sampling clock signal trailing edge. An adaptation control unit 52 processes the first and second data signals Z and S to determine how to adjust a filter control signal G supplied to filter 48 for controlling the amount of compensation filter 48 provides. Filter 48 includes a low-pass filter (LPF) 54, an amplifier 56, and a summer 57. LPF 54 filters received signal VR and amplifier 56 amplifies the output VR' of LPF 54 with a gain controlled by filter control signal G to produce an offset signal A. Summer 57 offsets received signal VR by offset signal A to produce compensated signal X. Filter 48 acts as a high-pass filter because summer 57 attenuates a portion (offset signal A) of the low frequency components of VR to produce compensated signal X. Since filter control signal G controls the magnitude of offset signal A, signal G controls the amount by which filter 48 attenuates low frequency components of VR. The transfer function of low-pass filter 54 is selected to compensate for the low-pass transfer function of channel 8 and will therefore depend on the nature of channel 8. A filter 54 implementing the simple low-pass s-domain transfer function $p/(s+p)$ will provide adequate compensation for many typical kinds of channels with the fixed value of p appropriately selected relative to the nature of channel 8.

Figure 9B:
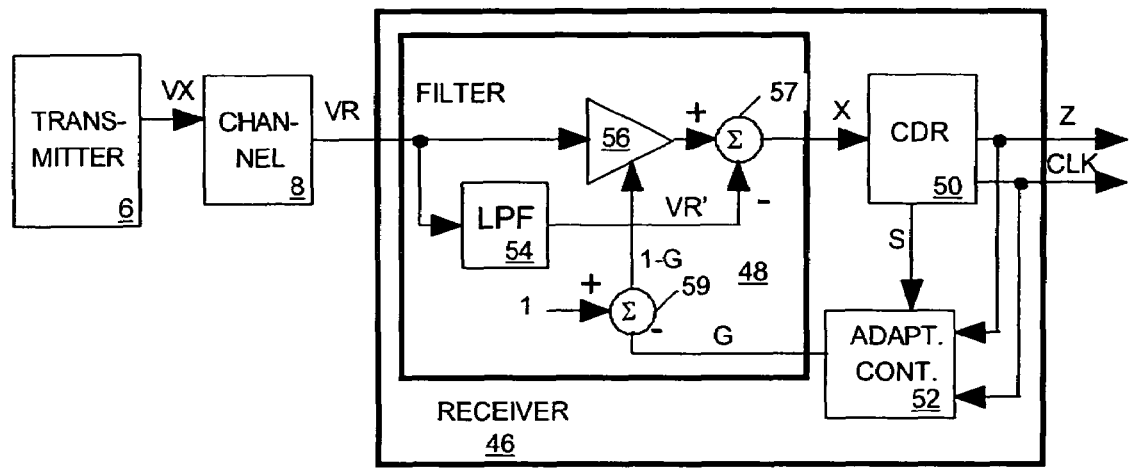

FIG. 9B depicts a communication system in accordance with an embodiment of the invention that is generally similar to that of FIG. 9A except that filter 48 is implemented differently. In the filter 48 of FIG. 9B, amplifier 56 amplifies the VR signal rather than the output VR' of low pass filter 54. A summer 59 subtracts the output G of adaptation control unit 52 from 1 to produce a gain control signal 1-G supplied as input to amplifier 56.

Figure 9C:
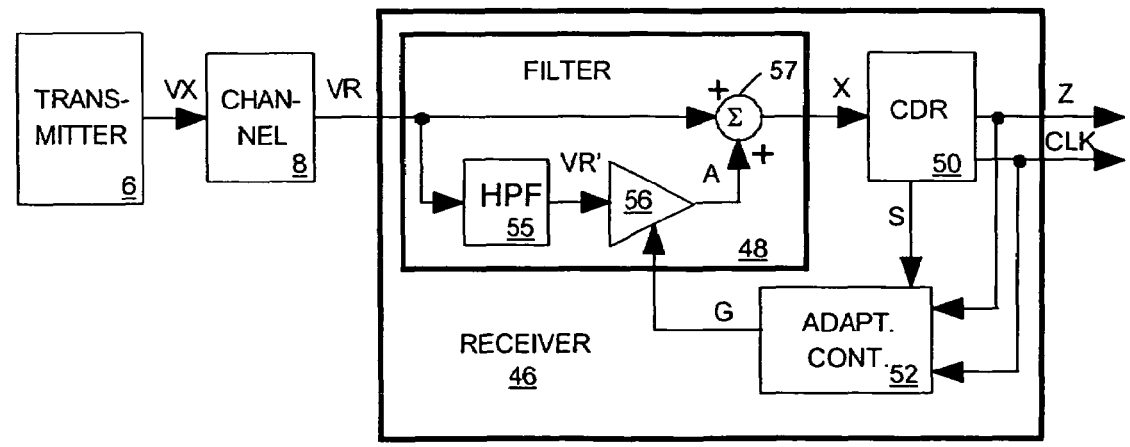

FIG. 9C depicts a communication system in accordance with an embodiment of the invention that is also generally similar to that of FIG. 9A except for differences in filter 48. In the filter 48 of FIG. 9C, the low pass filter 54 of FIG. 9A is replaced with a high pass filter 55. Also summer 57 of FIG. 9C adds VR and A rather than subtracting A from VR as in FIG. 9A. Thus while the filters 48 of FIGS. 9A and 9B attenuate low frequency components of VR to produce compensated signal X, the filter 48 of FIG. 9C amplifies the high frequency components of signal VR to produce compensated signal X.

Figure 10:
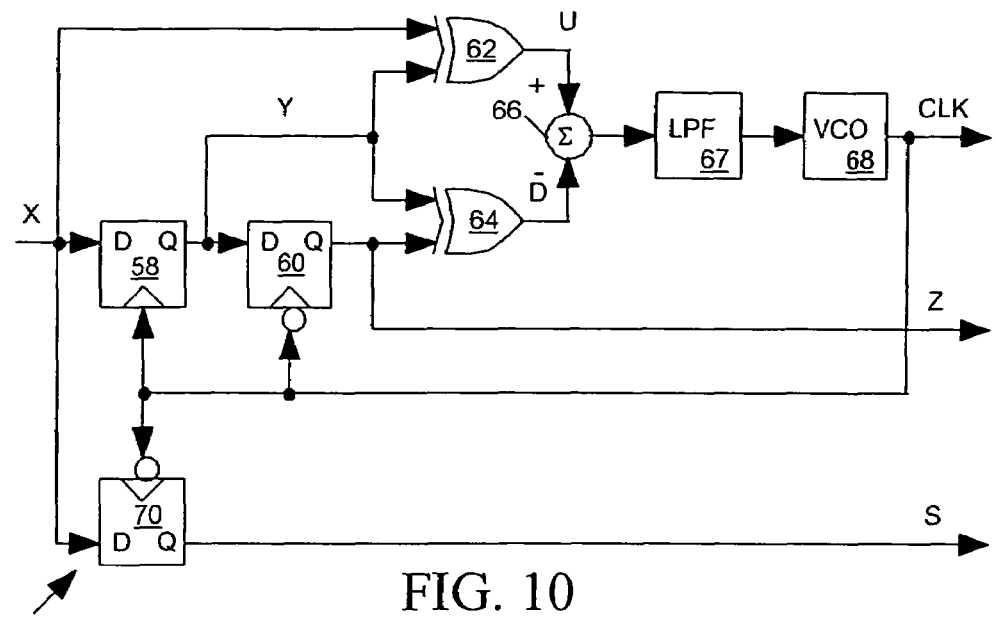
FIG. 10 illustrates the CDR unit of FIG. 9 in more detailed block diagram form.

FIG. 10 illustrates CDR 50 of FIG. 9 in more detailed block diagram form in accordance with an embodiment of the invention. In FIG. 10, a latch 58 samples compensated signal X on leading edges of the CLK signal to produce a signal Y, and a latch 60 samples signal Y on trailing edges of the CLK signal to produce the first data signal Z. An XOR gate 62 receiving signals X and Y generates a signal U, an XOR gate 64 receiving signals Y and Z generates a signal D, and a summer 66 offsets U by E to generate a signal E. Signal E represents an error in the phase of sampling clock signal CLK relative to its ideal sampling phase. A low pass filter 67 filters signal E to supply a control voltage input VC to a voltage-controlled oscillator (VCO) 68 producing sampling clock signal CLK. A latch 70 samples the signal X on the trailing edge of clock signal CLK to produce the second data signal S.

Figure 11:
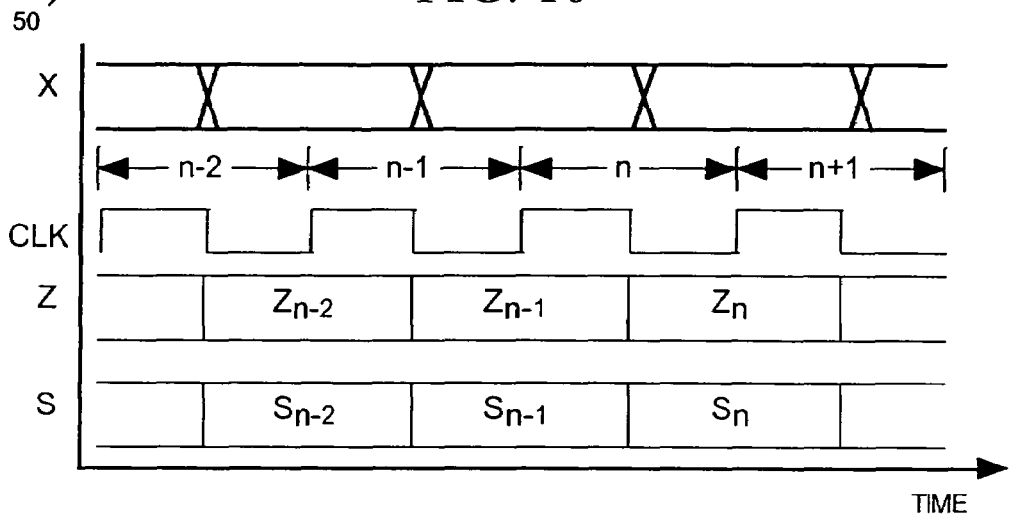
FIG. 11 is a timing diagram illustrating behavior of signals produced by the CDR unit of FIG. 10.

FIG. 11 illustrates the X, CLK, Z and S signals of FIGS. 10 and 9 as functions of time. The state $Z_n$ of first data signal Z following the $n^{th}$ sampling clock signal trailing edge indicates whether compensated signal X was at its high or low logic level on the $n^{th}$ sampling clock signal leading edge. The state $S_n$ of the second data signal S following the $n^{th}$ sampling clock signal trailing edge indicates whether compensated signal X was closer to its high logic level or to its low logic level on the $n^{th}$ sampling clock signal trailing edge. When the gain of amplifier 56 of FIG. 9 is too low, filter 48 does not provide a sufficient amount of compensation and symbols $S_{n-1}$ and $Z_{n-2}$ will have the same sign more often than they will have differing signs. This tells adaptation control unit 52 to increase the gain of amplifier 56 by increasing the magnitude of G. Conversely, when filter 48 over-compensates VR, $S_{n-1}$ and $Z_{n-2}$ will have differing signs more often then they will have the same signs, thereby telling adaptation control unit 52 to decrease the gain of amplifier 56. For example, adaptation control unit 52 may implement the transfer function labeled as EQ. 1:

$$G_{n+1}=G_n+\Delta_+, \text{ when } S_{n-1}=Z_{n-2}, \text{ else } G_{n+1}=G_n-\Delta_- \quad \text{(EQ. 1)}$$

where $G_n$ is a magnitude of the one filter control signal during an $n^{th}$ sampling clock signal cycle, $G_{n+1}$ is a magnitude of the one filter control signal during an $(n+1)^{th}$ sampling clock signal cycle, $Z_{n-2}$ is a state of the first data signal following an $(n-2)^{th}$ trailing edge of the sampling clock signal, $S_{n-1}$ is a state of the second data signal following an $(n-1)^{th}$ trailing edge of the sampling clock signal, and $\Delta_+$ and $\Delta_+$ are constants.

Figure 12:
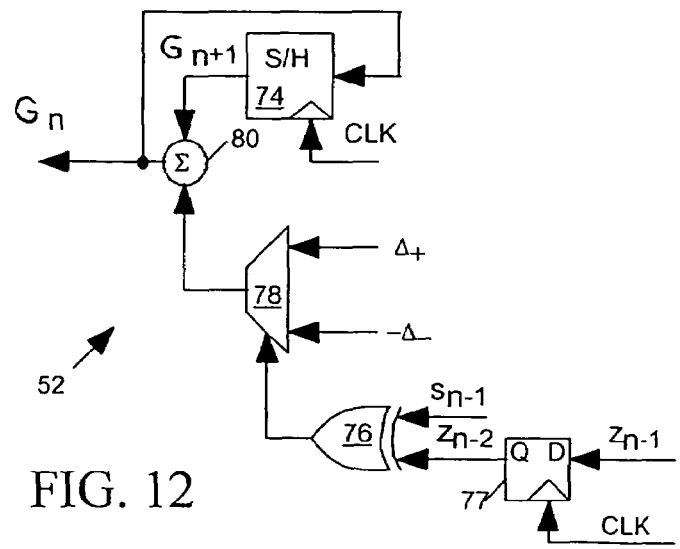
FIG. 12 illustrates the adaptation control unit of FIG. 9 in more detailed block diagram form.

The constants $\Delta_+$ and $\Delta_-$ are suitably no smaller than needed to ensure stability of the feedback path though adaptation control unit 52. $\Delta_+$ and $\Delta_-$ can be, but may not necessarily be the same. When $\Delta_+$ and $\Delta_-$ are set to be the same, the adaptation control will adjust the filter 48 until $S_{n-1}$ and $Z_{n-2}$ are of the same sign 50% of the time. An adaptation control unit 52 implementing this transfer function will keep the gain of amplifier 56 of FIG. 9 near a value that optimizes the compensation provided by filter 48. FIG. 12 illustrates an example adaptation control unit 52 providing the above transfer function requiring only a sample and hold (S/H) circuit 74, an XOR gate 76, a latch 77, a multiplexer 78 and a summing amplifier 80.

Adaptation control unit 52 could implement other transfer functions, such as, for example, the transfer function labeled as EQ. 2 shown below:

$$G_{n+1}=G_n, \text{ when } Z_n=Z_{n-1},$$

$$\text{else } G_{n+1}=G_n+\Delta_+, \text{ when } S_{n-1}=Z_{n-2},$$

$$\text{else } G_{n+1}=G_n-\Delta_-. \quad \text{(EQ. 2)}$$

where $G_n$ is a magnitude of the one filter control signal during an $n^{th}$ sampling clock signal cycle, $G_{n+1}$ is a magnitude of the one filter control signal during an $(n+1)^{th}$ sampling clock signal, $Z_n$ is a state of the first data signal following an $n^{th}$ trailing edge of the sampling clock signal, $Z_{n-1}$ is a state of the first data signal following an $(n-1)^{th}$ trailing edge of the sampling clock signal, $Z_{n-2}$ is a state of the first data signal following an $(n-2)^{th}$ trailing edge of the sampling clock signal, $S_{n-1}$ is a state of the second data signal following the $(n-1)^{th}$ trailing edge of the sampling clock signal, and $\Delta_+$ and $\Delta_-$ are constants.

Figure 13:
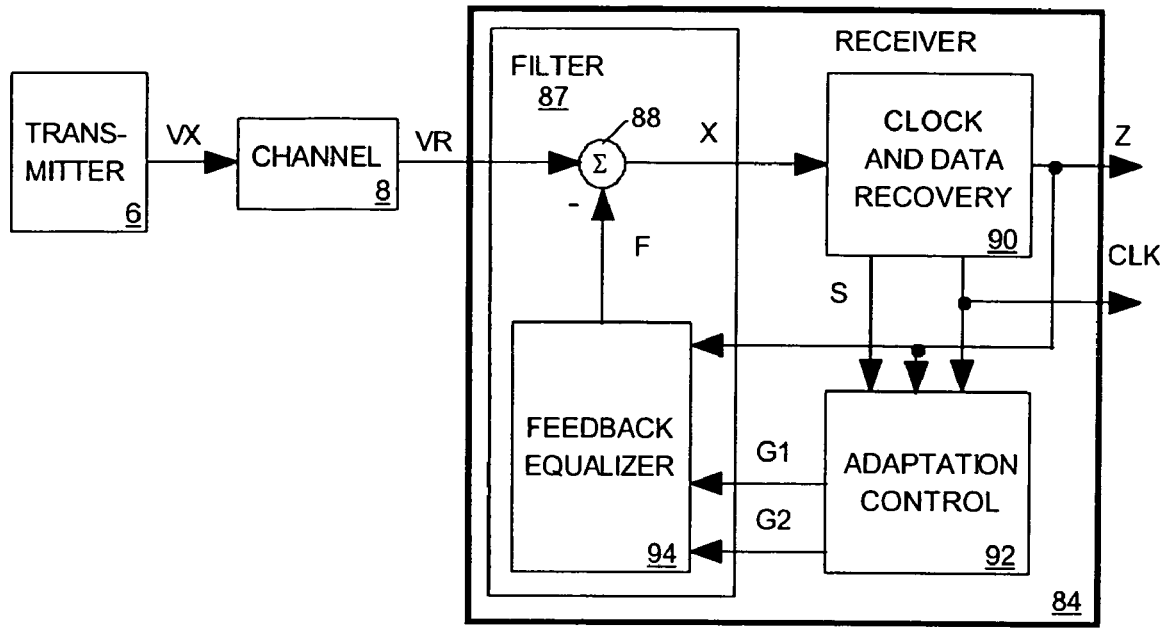
FIG. 13 illustrates in block diagram form a communication system including a receiver employing an adaptive feedback equalization system in accordance with an embodiment of the present invention.

An adaptation control unit 52 employing this algorithm increments or decrements the amplifier gain only when it detects a state change in the first data signal $Z_n$. While this transfer function requires more hardware to implement than the transfer function implemented by the adaptation control unit of FIG. 12, it reduces variation in signal G, thereby reducing noise in compensation signal X. Adaptive Feedback Equalization FIG. 13 illustrates a receiver 84 for carrying out the same function as receiver 46 of FIG. 9. However, while receiver 46 employs an adaptive feed-forward equalization system to compensate for ISI distortion, receiver 84 employs an adaptive feedback equalization system. Receiver 84 includes a filter 87 that includes a summing amplifier 88 for offsetting received signal VR by an offset signal F to produce a compensated signal X. A CDR unit 90, suitably similar to CDR unit 50 of FIG. 10, processes compensated signal X to produce first and second data signals Z and S and sampling clock signal CLK in a similar manner. An adaptation control unit 92 processes first and second signals S and Z to generate two filter control signals G1 and G2 supplied to a feedback equalizer unit 94.

Figure 14:
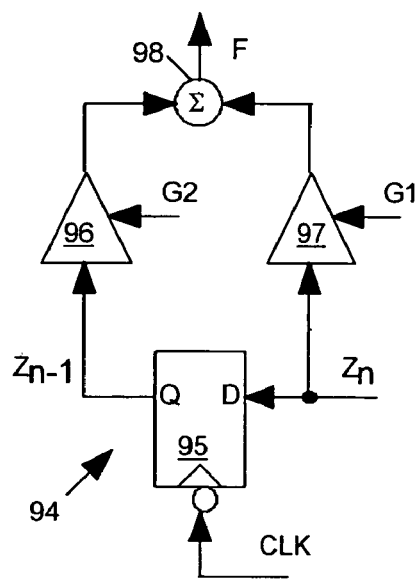
FIG. 14 illustrates the feedback equalizer unit of FIG. 13 in more detailed block diagram form.

FIG. 14 illustrates feedback equalizer unit 94 of FIG. 13 in more detail. Producing the offset signal F input to summing amplifier 88 as functions of the G1, G2 and Z signals, feedback equalizer unit 94 suitably includes a latch 95, a pair of amplifiers 96 and 97 having gains controlled by filter control signals G1 and G2, and a summing amplifier 98. First data signal Z drives amplifier 97. The output of latch 95, representing the state of first data signal Z on each trailing edge of the CLK signal, provides an amplifier 96 input. Summing amplifier 98 generates offset signal F as a sum of outputs of amplifiers 96 and 97. Adaptation control circuit 92 of FIG. 13 suitably implements, for example, the following adaptation algorithm labeled as EQ. 3:

$$G1_{n+1}=G1_n+\Delta_+ \text{ when } S_{n-1}=Z_{n-2}, \text{ else } G1_{n+1}=G1_n-\Delta_-$$

$$G2_{n+1}=G2_n+\Delta_+ \text{ when } S_{n-1}=Z_{n-3}, \text{ else } G2_{n+1}=G2_n-\Delta_- \quad \text{(EQ. 3)}$$

where $G1_n$ is a magnitude of the first filter control signal during an $n^{th}$ sampling clock signal cycle, $G1_{n+1}$ is a magnitude of the first filter control signal during an $(n+1)^{th}$ sampling clock signal cycle, $G2_n$ is a magnitude of the second filter control signal during the $n^{th}$ sampling clock signal cycle, $G2_{n+1}$ is a magnitude of the second filter control signal during the $(n+1)^{th}$ sampling clock signal cycle, $Z_{n-2}$ is a state of the first data signal following an $(n-2)^{th}$ trailing edge of the sampling clock signal $Z_{n-3}$ is a state of the first data signal following an $(n-3)^{th}$ trailing edge of the sampling clock signal, $S_{n-1}$ is a state of the second data signal following an $(n-1)^{th}$ trailing edge of the sampling clock signal, and $\Delta_+$, and $\Delta_-$ are constants.

Adaptation control circuit 92 increases G1 when $S_{n-1}$ is of the same sign as $Z_{n-2}$ because this indicates that signal X is under-compensated. Otherwise, adaptation control circuit 92 considers signal X to be over-compensated and decreases G1. Similarly, adaptation control circuit 92 increases G2 when $S_{n-1}$ is of the same sign as $Z_{n-3}$ because this indicates that signal X is under-compensated. Otherwise, adaptation control circuit 92 considers signal X to be over-compensated and decreases G2.

The above-described described exemplary embodiments of a receiver in accordance with the invention includes a system for equalizing a received signal VR that is a low-pass filtered version of a transmitted signal VX to substantially compensate for ISI distortion in the received signal. Rather than controlling the amount of compensation based on a jitter estimate signal derived from the compensated signal X, the equalization system controls the amount of ISI compensation based on comparisons of samples (signal Z) of the compensated signal X acquired on leading edges of the sampling clock signal and samples (signal S) of signal X acquired on the trailing edges of the sample clock. Since the hardware (one latch) needed to generate and process data signals S and Z is relatively simple and inexpensive compared to the hardware prior art equalization systems need to generate and process a jitter estimate signal, the invention reduces equalization system costs.

Those of skill in the art will appreciate that the exemplary embodiments described above can be modified in various ways without departing from the true sprit of the invention. For example receivers 46 and 84 of FIGS. 9 and 12 could be modified to include conventional systems for compensating for other types of channel distortion such as, for example, insertion losses or baseline wander. Also, while the specification above describes examples of suitable transfer functions and/or architectures for various components of receivers 46 and 84 such as filters, CDR units, adaptation control units and equalizers, those of skill in the art will appreciate that the transfer functions and internal architectures of such components are matters of design choice and that other component internal architectures and transfer functions could be employed without altering the basic function of those components within the receivers.

Figure 15A:
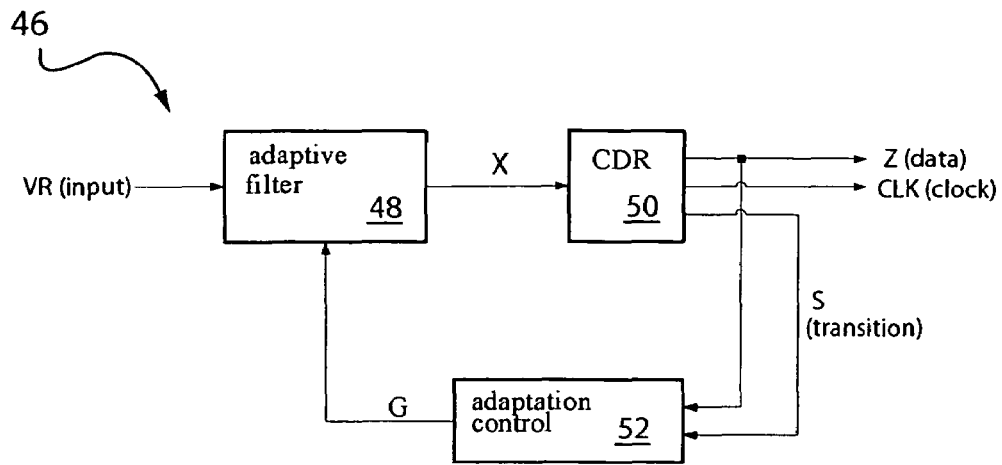
FIG. 15A illustrates a simplified schematic diagram of the receiver of FIG. 9.

FIG. 15A illustrates a simplified schematic diagram of receiver 46 of FIG. 9. As shown in FIG. 15A, receiver 46 may include an adaptive filter 48, a CDR 50 (see FIG. 10), and an adaptation control unit 52. As described above, signal VR represents a transmitted signal VX after being distorted by a communication channel (e.g. cable or transmission line). The signal VR is received by receiver 46 and input to adaptive filter 48. Adaptive filter 48 equalizes the signal VR to compensate for the distortion introduced by the communication channel to generate a compensated signal X. Compensated signal X is input to CDR 50, which generates a sampling clock signal CLK and data signals Z and S based on the compensated signal X. Data signal Z comprises data from the received VR signal sampled at the leading edge of the sampling clock signal CLK. Data signal S, also referred to herein as "transition signal", comprises samples of the compensated signal X taken at the trailing edge of sampling clock signal CLK. Adaptation control unit 52 uses the data signal Z and transition signal S to generate a control signal G employed by adaptive filter 48 to equalize the signal VR. In one embodiment, the control signal G changes a gain of an amplifier (e.g. a voltage controlled gain stage) in the adaptive filter 48 to control the boosting of the high frequency components of the signal VR relative to the low frequency components of the signal VR. As will be more apparent below, the control signal G may also be used to control a gain of an amplifier in an adaptive filter to control the attenuation of high frequency components of the signal VR relative to the low frequency components of the signal VR.

In light of the present disclosure, those of ordinary skill in the art will appreciate that the aforementioned components of receiver 46 may be implemented a variety of ways without detracting from the merits of the present invention. The components of receiver 46 may be implemented using differential circuitry, single-ended circuitry, or both. For example, in applications where the input signal VR is differential, low pass filter 54 (or high pass filter 55), amplifier 56, and summer 57 may comprise differential circuits. In that case, a differential to single-ended conversion circuit, such as a comparator, may be used to convert the differential output signal of a differential summer 57 (i.e. differential compensated signal X) to a logical signal X suitable for input to a CDR 50 that comprises digital circuits. The control signal G used to control the gain of amplifier 56 may also be in single-ended or differential form.

Figure 15B:
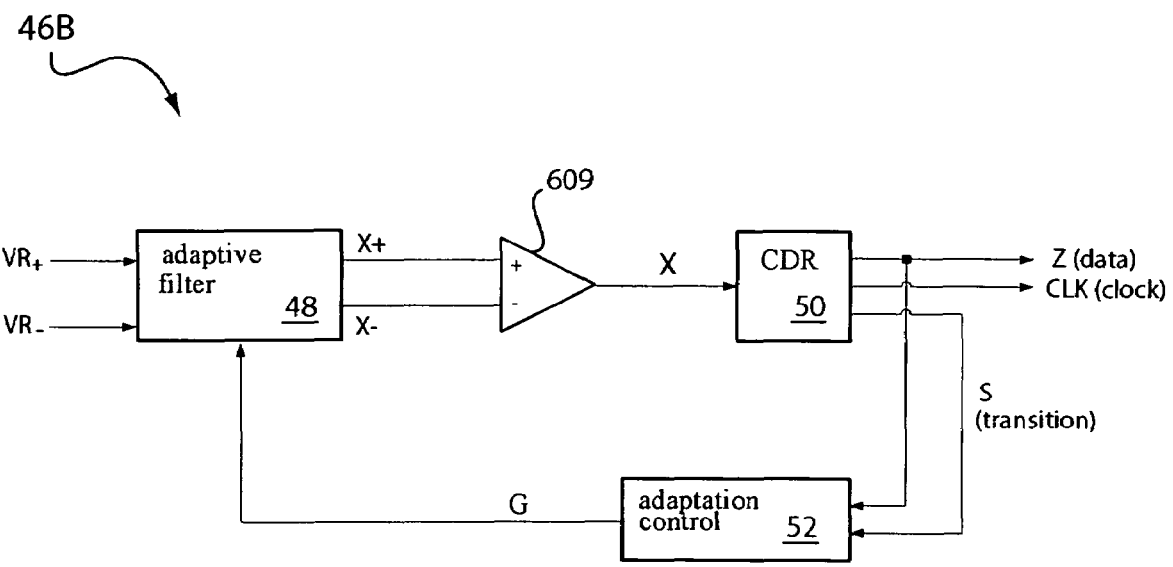
FIG. 15B illustrates a simplified schematic diagram of an embodiment of the receiver of FIG. 9 in accordance with an embodiment of the present invention.

FIG. 15B illustrates a simplified schematic diagram of a receiver 46B in accordance with an embodiment of the present invention. Receiver 46B is a specific embodiment of a receiver 46. Receiver 46B receives a differential signal VR consisting of voltages $VR_+$ and $VR_-$ as input to adaptive filter 48. The adaptive filter 48 of FIG. 15B accordingly outputs a differential compensated signal X consisting of voltages X+ and X−. A comparator 609 converts the differential compensated signal X to a logical single-ended signal for input to CDR 50. Receiver 46B otherwise operates the same as receiver 46. Note that comparator 609 may be implemented separately or integrated with adaptive filter 48 or CDR 50.

Figure 16:
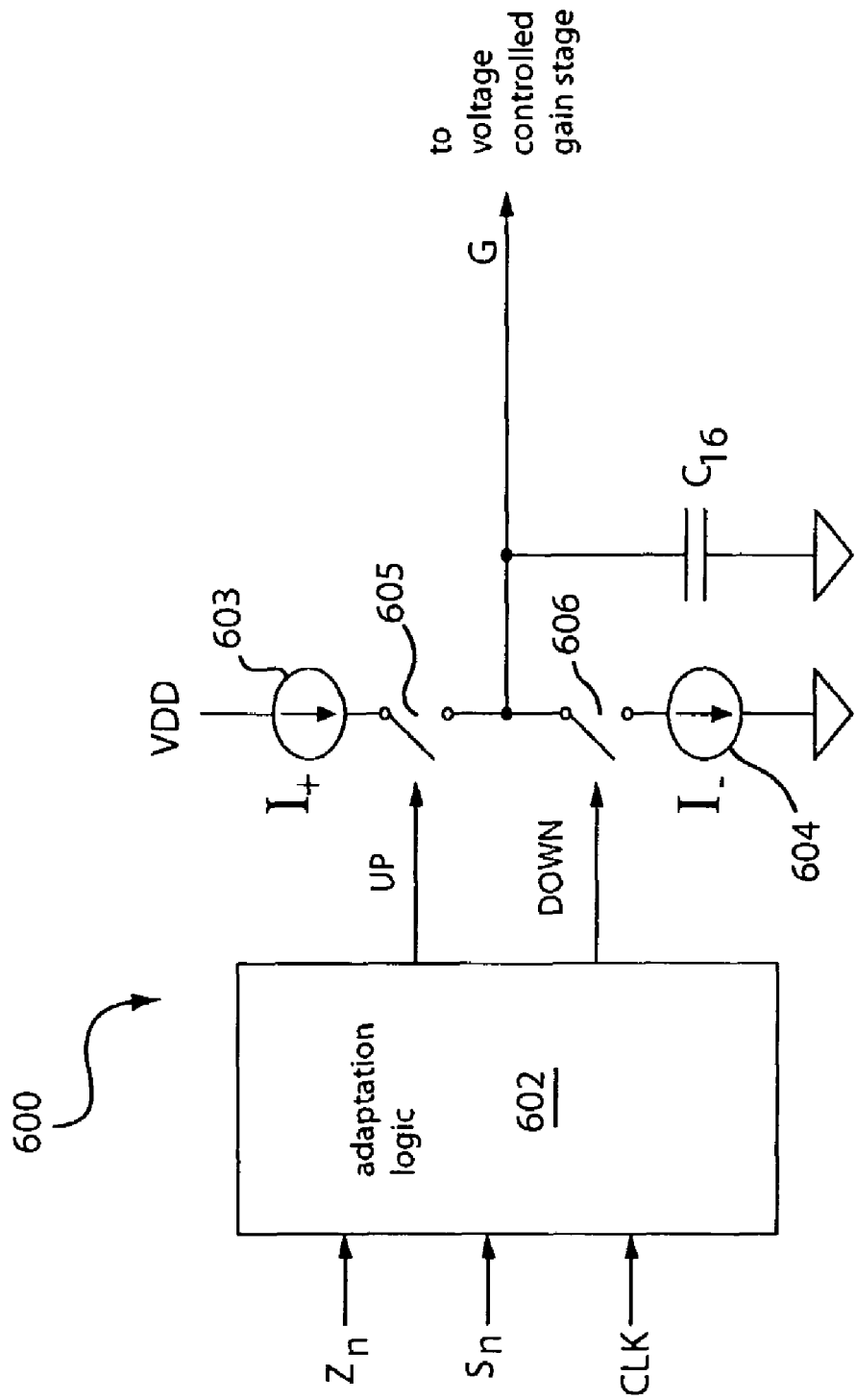
FIG. 16 illustrates a schematic diagram of an adaptation control unit in accordance with an embodiment of the present invention.

FIG. 16 illustrates a schematic diagram of an adaptation control unit 600 in accordance with an embodiment of the present invention. Adaptation control unit 600 is a charge pump implementation of an adaptation control unit 52. Adaptation control unit 600 may thus be used as an adaptation control unit of a receiver 46. In one embodiment, adaptation control unit 600 includes adaptation logic 602, a current source 603, a current sink 604, and a capacitor $C_{16}$.

Adaptation logic 602 may comprise digital circuitry, such as combinational logic, for example. In the example of FIG. 16, adaptation logic 602 processes the data signal Z, transition signal S, and sampling clock CLK signal from CDR 50 to generate an UP control signal and a DN (i.e. down) control signal. The UP and DN signals control the closing and opening of their respective switches 605 and 606. When the UP signal is active (a logical 1 or HIGH in this example), switch 605 closes to allow current source 603 to inject charge into capacitor $C_{16}$. Similarly, when the DN signal is active, switch 606 closes to allow current sink 604 to drain charge from the capacitor $C_{16}$. The UP and DN signals thus control the amount of charge in capacitor $C_{16}$, which represents the control signal G used to control a gain stage in adaptive filter 48.

In the embodiment where the behavior of control signal G is dictated by transfer function EQ. 1, described above, adaptation logic 602 may generate the UP and DN signals as follows:

UP=1 when $S_{n-1}=Z_{n-2}$, else UP=0

DN=1 when $S_{n-1} \neq Z_{n-2}$, else DN=0

In this example, the UP and DN signals are active when they are at a logical "1" and inactive when they are at a logical "0". When UP=1 and DN=0, switch 605 closes and switch 606 opens, thereby allowing current source 603 to inject charge into capacitor $C_{16}$. The voltage at capacitor $C_{16}$ (and control signal G) thus increases by an amount $\Delta_+ = I_+(T_{CLK}/C_{16})$, where $T_{CLK}$ is the period of sampling clock signal CLK. When UP=0 and DN=1, switch 605 opens and switch 606 closes, thereby draining charge from capacitor $C_{16}$ to current sink 604. This decreases the voltage at the capacitor (and control signal G) by an amount $\Delta_- = I_-(T_{CLK}/C_{16})$. Adaptation control unit 600 thus effectively generates the control signal G, which is essentially the charge stored at the capacitor $C_{16}$ in this embodiment. The control signal G may be input to adaptive filter 48 to control a gain stage and equalize an input signal VR.

Adaptation control unit 600 may also implement other transfer functions for generating control signal G. For example, in another embodiment where the behavior of control signal G is dictated by transfer function EQ. 2, described above, adaptation logic 602 may generate UP and DN signals as follows:

UP=0, when $Z_n = Z_{n-1}$, else UP=1, when $S_{n-1} = Z_{n-2}$, else UP=0 and

DN=0, when $Z_n = Z_{n-1}$, else DN=0, when $S_{n-1} = Z_{n-2}$, else DN=1

When UP=0 and DN=0, the voltage at capacitor $C_{16}$ remains unchanged because neither current source 603 nor current sink 604 is connected to capacitor $C_{16}$. The changes to the voltage at capacitor $C1_6$ when UP=1 and DN=0 or when UP=0 and DN=1 are as previously described.

Figure 17:
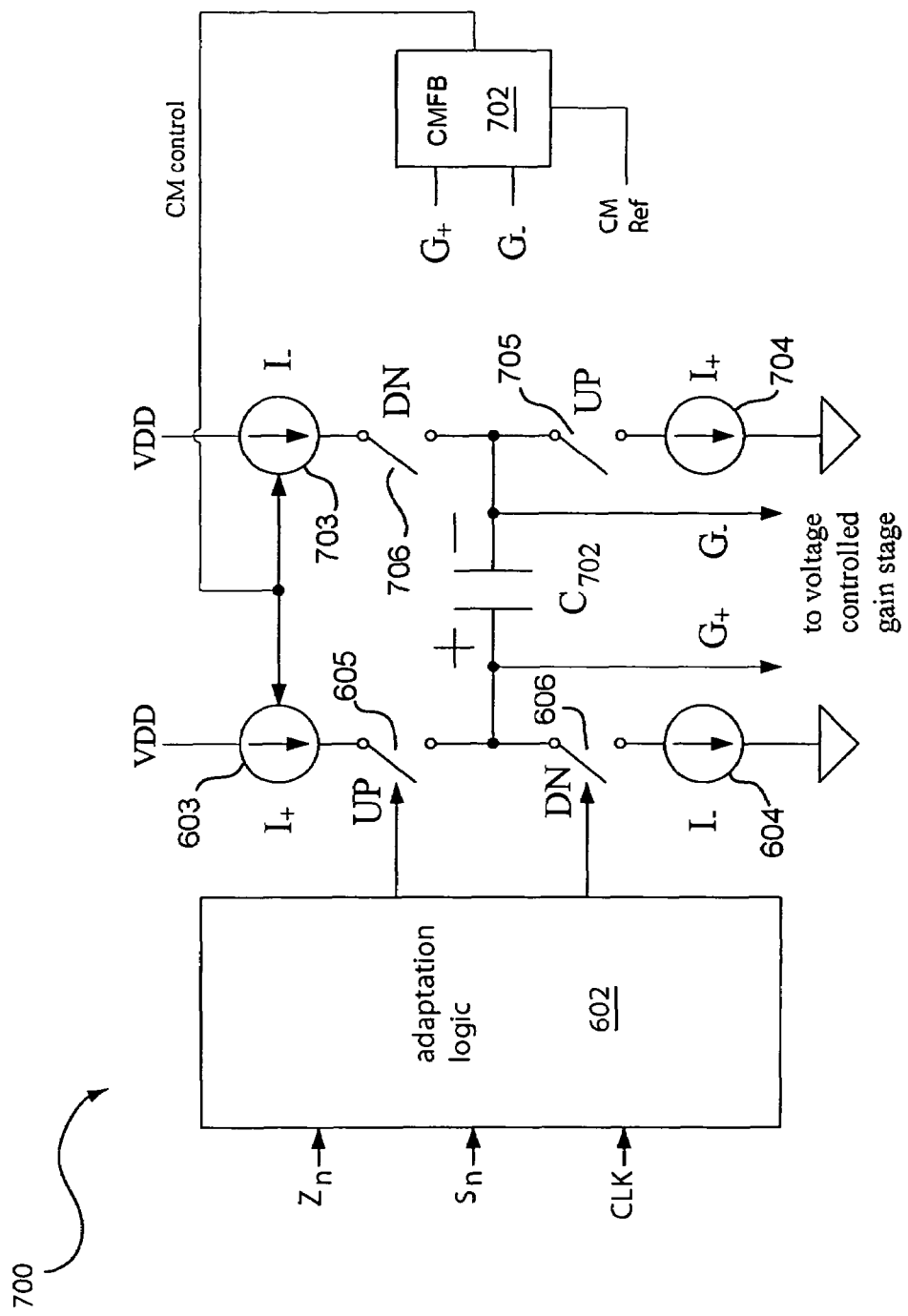
FIG. 17 illustrates a schematic diagram of an adaptation control unit that generates a differential control signal, in accordance with an embodiment of the present invention.

The analog circuits disclosed herein may be implemented in differential or single-ended form. In some integrated circuit implementations, a differential topology may be desired to improve noise immunity. FIG. 17 illustrates a schematic diagram of an adaptation control unit 700 that generates a differential control signal G comprising voltages $G_+$ and $G_-$, in accordance with an embodiment of the present invention. Like adaptation control unit 600, adaptation control unit 700 comprises charge pump circuitry. Adaptation control logic 602 generates the UP and DN signals the same way in both adaptation control units 600 and 700.

In the example of FIG. 17, adaptation control unit includes another current source 703, a switch 705 controlled by the UP signal, another current sink 704, and a switch 706 controlled by the DN signal. When UP=1 and DN=0, current source 603 injects charge to the positive end of capacitor $C_{702}$ and current sink 704 drains charge from the negative end of capacitor $C_{702}$. The differential voltage across the capacitor $C_{702}$ is thus increased. When UP=0 and DN=1, current sink 604 drains charge from the positive end of capacitor $C_{702}$ and current source 703 injects charge to the negative end of capacitor $C_{702}$. The differential voltage across the capacitor $C_{702}$ is thus decreased. As shown in FIG. 17, the voltage signals $G_+$ and $G_-$ are taken from the positive and negative ends, respectively, of capacitor $C7_{02}$. The voltage difference between the positive and negative ends of capacitor $C_{702}$ (i.e. the difference between voltages $G_+$ and $G_-$) represents the control signal G fed to a differential control signal input of a gain stage (e.g. see FIG. 19) of an adaptive filter.

Still referring to FIG. 17, a common mode feedback block (CMFB) 702 may be employed to set the common mode of control signal G (i.e. the mean value between voltages $G_+$ and $G_-$). CMFB 702 estimates the mean value between $G_+$ and $G_-$ (i.e. $(G_+ + G_-)/2$) and compares it against a predetermined common mode reference voltage, which is labeled as "CM Ref" in FIG. 17. The voltage difference between the mean value between $G_+$ and $G_-$ and the common mode reference voltage, labeled as "CM control" in FIG. 17, is fed back to control current sources 603 and 703, which are both tied to the power supply VDD. The CM control signal increases the outputs of current sources 603 and 703 together when the mean value between $G_+$ and $G_-$ is lower than CM Ref, making the charge injected at both ends of $C_{702}$ more than the charge drained by current sinks 604 and 704, thus also increasing the $G_+$ and $G_-$ voltages together. The CM control signal decreases the outputs of current sources 603 and 703 together when the mean value between $G_+$ and $G_-$ is higher than CM Ref, making the charge injected to both ends of $C_{702}$ less than the charge drained by current sinks 604 and 704, thus also decreasing the $G_+$ and $G_-$ voltages together. The $G_+$ and $G_-$ voltages are fed back to CMFB to complete the common mode feedback loop. The common mode feedback thus continuously adjusts the common mode value of the control signal G.

Note that charge pump circuits other than those shown in FIGS. 16 and 17 may also be employed without detracting from the merits of the present invention.

Figure 18:
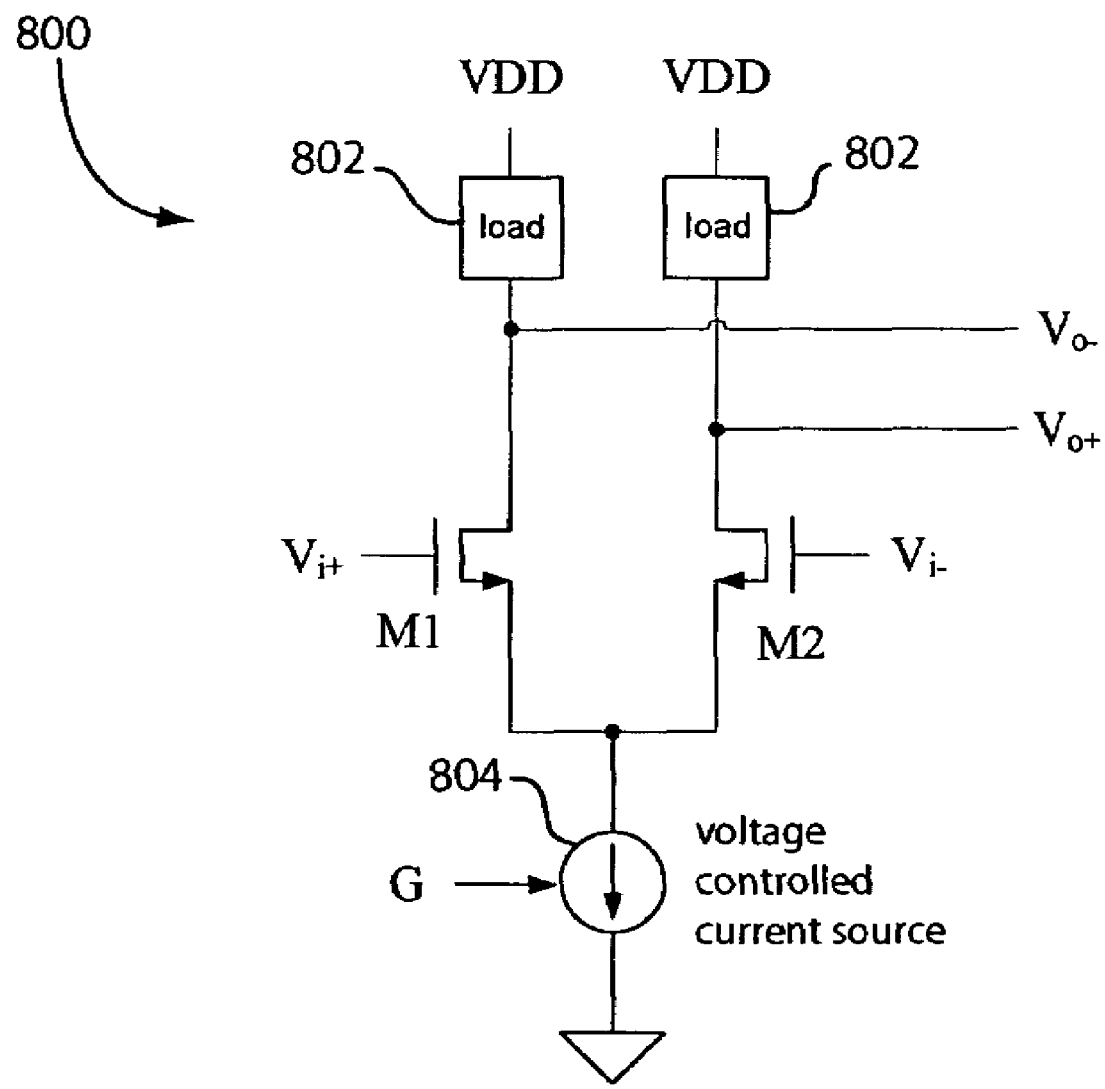
FIG. 18 illustrates a schematic diagram of a voltage controlled gain stage in accordance with an embodiment of the present invention.

Referring now to FIG. 18, there is shown a voltage controlled gain stage 800 in accordance with an embodiment of the present invention. Voltage controlled gain stage 800 may be employed as an amplifier 56 in a receiver 46 (see FIGS. 9A, 9B, and 9C). In the example of FIG. 18, gain stage 800 amplifies a differential input signal $V_i$ comprising voltages $V_{i+}$ and $V_{i-}$ to generate a differential output signal $V_o$ comprising voltages $V_{o+}$ and $V_{o-}$. Gain stage 800 may thus be used in applications where the input signal VR is differential. In that case, the positive $VR_+$ voltage of the differential signal VR is input to the gate of transistor M1 and the negative $VR_-$ voltage of the differential signal VR is input to the gate of transistor M2. Gain stage 800 accepts a single-ended control signal G for controlling the output current of a voltage controlled current source 804. For example, the control signal G generated by adaptation control unit 600 may be used to control the output of current source 804. Gain stage 800 generates the differential output signal $V_o$ comprising a positive voltage $V_{o+}$ and a negative voltage $V_{o-}$, which may be input to a differential summer 57 or other circuit providing summing functionality.

In the example of FIG. 18, a load 802 may comprise a resistor, an inductor, or a transistor connected to the power supply voltage VDD. Transistors M1 and M2 form a differential amplifier biased by current source 804. In general, the gain of a FET amplifier is equal to the transconductance of the transistor (M1 and M2 in this example) multiplied by the impedance of the load (load 802 in this example). In the example of FIG. 18, the transconductance of transistors M1 and M2, and thus the gain of the differential amplifier, increases as their biasing current increases. Control signal G can thus control the gain of voltage controlled gain stage 800 by varying the output current of voltage controlled current source 804 to vary the bias current of the differential transistor pair M1-M2.

One problem with voltage controlled gain stage 800 is that it may be difficult to accurately constrain its gain between 0 and 1. In applications where this is a concern, a voltage controlled gain stage 900 shown in FIG. 19 may be used instead of gain stage 800.

Figure 19:
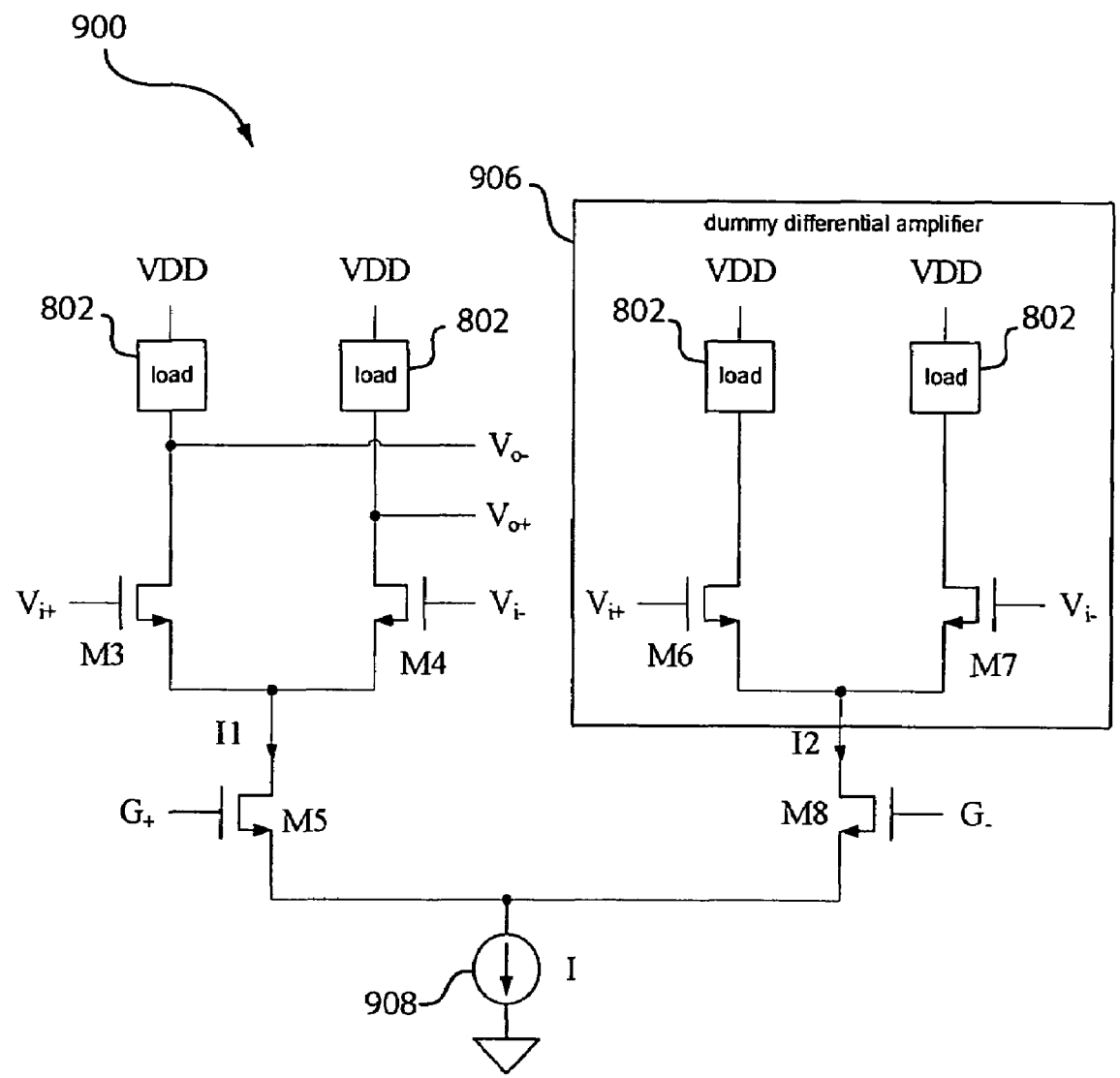
FIG. 19 illustrates a schematic diagram of another voltage controlled gain stage in accordance with an embodiment of the present invention.

FIG. 19 shows a voltage controlled gain stage 900 in accordance with an embodiment of the present invention. Voltage controlled gain stage 900 may be used as an amplifier 56 in a receiver 46. Like voltage controlled gain stage 800, voltage controlled gain stage 900 amplifies a differential input signal $V_i$ to generate a differential output signal $V_o$. Differential input signal $V_i$ may be a differential input signal VR, while differential output voltage $V_o$ may be input to a differential summer 57. Voltage controlled gain stage 900 accepts a differential control signal G, such as that generated by adaptation control unit 700 shown in FIG. 17. Voltage controlled gain stage 900 also includes loads 802 and power supply voltage VDD.

In the example of FIG. 19, transistors M5 and M8 form a differential amplifier biased by a constant current source 908. The output of current source 908, which is tail current I in FIG. 19, is split into currents I1 and I2. The tail current I is thus equal to I1+I2. The current I1 biases the differential amplifier formed by transistors M3 and M4, while the current I2 biases the differential amplifier formed by transistors M6 and M7. Note that the differential transistor pairs M3-M4 and M6-M7 are similar to the differential transistor pair M1-M2 in voltage controlled gain stage 800 shown in FIG. 18, the main difference being the bias current. Further note that the differential transistor pair M6-M7, also referred to as a "dummy differential amplifier 906," may also be replaced with a passive or active load device.

In voltage controlled gain stage 900, the differential control signal G controls the differential transistor pair M5-M8 to control the splitting of the tail current I, and thus the biasing of the differential transistor pairs M3-M4 and M6-M7. This, in turn, controls the gain of the differential transistor pair M3-M4, and thus output voltages $V_{o+}$ and $V_{o-}$. In one extreme, the tail current I is wholly swung to current I1 (i.e. I1=I and I2=0). This happens when voltage $G_+$ is high and fully turns ON transistor M5, while voltage $G_-$ is low and fully turns OFF transistor M8. In the other extreme, the tail current is wholly swung to current I2 (i.e. I1=0 and I2=I). This other extreme occurs when voltage $G_+$ is low and fully turns OFF transistor M5, while voltage $G_-$ is high and fully turns ON transistor M8. Between these extremes, gain stage 900 amplifies the input signal $V_i$ based on the value of control signal G as needed for equalization.

Generally speaking, it is to be noted that the absolute gain of the voltage controlled gain stage of an adaptive filter is relatively unimportant. More important is the relative gain between the fixed gain path and the variable gain path of the adaptive filter. Using adaptive filter 48 of FIG. 9A as an example, the summer 57 generates an output that represents the difference between the unity gain path (fixed gain path; represented by wire from channel 8 directly to summer 57) and the low pass filter path (variable gain path; through low pass filter 54 and amplifier 56). What matters is the relative gain between the unity gain and low pass filter paths, not the absolute gains of both paths. That is, what is important is that in the adaptive filter 48 of FIG. 9A, the gain of the low pass filter path is between 0 and 1 when normalized with a reference gain. With voltage controlled gain stage 900, the reference gain is the gain of the differential amplifier formed by transistors M3 and M4 when tail current I is fully swung to current I1.

Figure 20:
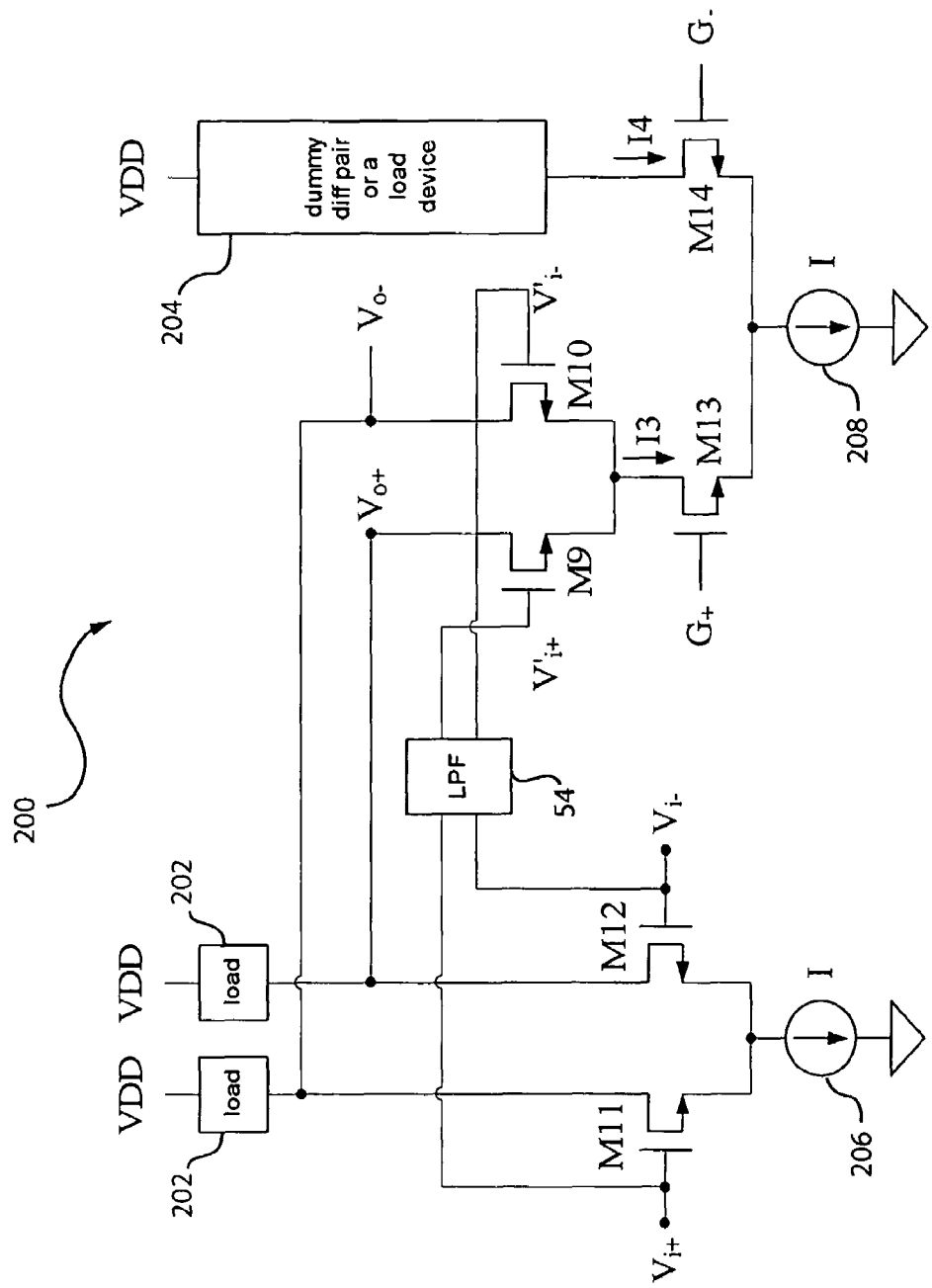
FIG. 20 illustrates a schematic diagram of an adaptive filter in accordance with an embodiment of the present invention.

FIG. 20 illustrates a schematic diagram of an adaptive filter 200 in accordance with an embodiment of the present invention. Adaptive filter 200 implements the adaptive filter 48 of FIG. 9A using differential topology. Adaptive filter 200 accepts a differential input signal $V_i$ (e.g. differential input signal VR) consisting of voltages $V_{i+}$ and $V_{i-}$ at the gates of transistors M11 and M12, respectively. Adaptive filter 200 generates a differential output signal $V_o$ consisting of voltages $V_{o+}$ and $V_{o-}$, which is a differential compensated signal X. A comparator, such as comparator 609 shown in FIG. 15B may be employed to convert the differential output signal $V_o$ to single-ended for input to a CDR 50.

In the example of FIG. 20, current sources 206 and 208 output the same tail current 1, and may be from a current mirror, for example. Loads 202 and 204 may be active or passive load devices. For example, load 204 may be a dummy differential amplifier. Transistors M11 and 12 form a first differential amplifier serving as a fixed gain stage. The first differential amplifier provides a fixed gain path, providing the same functionality as the unity gain path of adaptive filter 48 of FIG. 9A. A second differential amplifier comprising transistors M9 and M10 shares the same loads 202 as the first differential amplifier. The gain of the second differential amplifier is variable and depends on current I3. A differential control signal G, such as that generated by adaptation control unit 700 shown in FIG. 17, is used to control the splitting of the output of current source 208 into currents I3 and I4 using a third differential amplifier comprising transistors M13 and M14. The gain of the second differential amplifier formed by transistors M9 and M10 is therefore variable and controlled by control signal G. In one embodiment, the gain of the second differential amplifier is configured to vary between 0 and 1 using the control signal G.

Still referring to FIG. 20, the differential input voltages $V_{i+}$ and $V_{i-}$ are input to the first differential amplifier comprising transistors M11 and M12 and to low pass filter 54 (see also FIG. 9A). Low pass filter 54, which may comprise a passive RC network, generates low pass filtered differential input signal $V'_i$ consisting of voltages $V'_{i+}$ and $V'_{i-}$ that are amplified by the second differential amplifier consisting of transistors M9 and M10. Low pass filter 54 and the second differential amplifier thus provide a variable gain path, providing the same functionality as the low pass filter path of adaptive filter 48 of FIG. 9A. Although the differential amplifier formed by transistors M9 and M10 share the same load as the differential amplifier formed by transistors M11 and M12, the polarity of the output voltages $V_{o+}$ and $V_{o-}$ at the drains of the transistors are reversed. Therefore, the output of the differential transistor pair M9-M10 will be subtracted from the output of the differential transistor pair M11-M12. This effectively implements the summer 57 shown in FIG. 9A. In this manner, the input signal $V_i$ is offset by a scaled low pass filtered version of the input signal $V_i$. The scaling factor is between 0 and 1, and depends on the differential control voltages $G_+$ and $G_-$. Adaptive filter 200 thus fully implements the adaptive filter 48 of FIG. 9A, except for the fixed gain factor (instead of unity), which is not of interest as far equalization is concerned.

In the adaptive filter 48 of FIG. 9A, there is no equalization when the relative gain on the low pass filter path is zero. When the relative gain on the low pass filter path is unity, the adaptive filter 48 of FIG. 9A provides maximum boost to equalize high frequency components of the input signal relative to the low frequency components of the input signal. This works well in applications where the frequency response of the communication channel to be equalized exhibits a low pass nature. Although most channels, including coaxial cables or other forms of transmission lines, exhibit a low pass nature, some exceptions may occur. For example, to compensate for the high frequency attenuation due to transmission lines, some transmitters may intentionally boost the high frequency components of the signal before sending the signal to the transmission line. This is referred to as "pre-emphasis" or "transmitter side equalization." Using the pre-emphasis technique, the effective reach of the transmission line can be extended because the attenuation of high frequency components of the signal are at least partially compensated at the transmitter side. However, if the transmission line is very short, the transmitter may over-equalize the signal. In that case, the high frequency components of the signal may need to be attenuated at the receiver.

Figure 21:
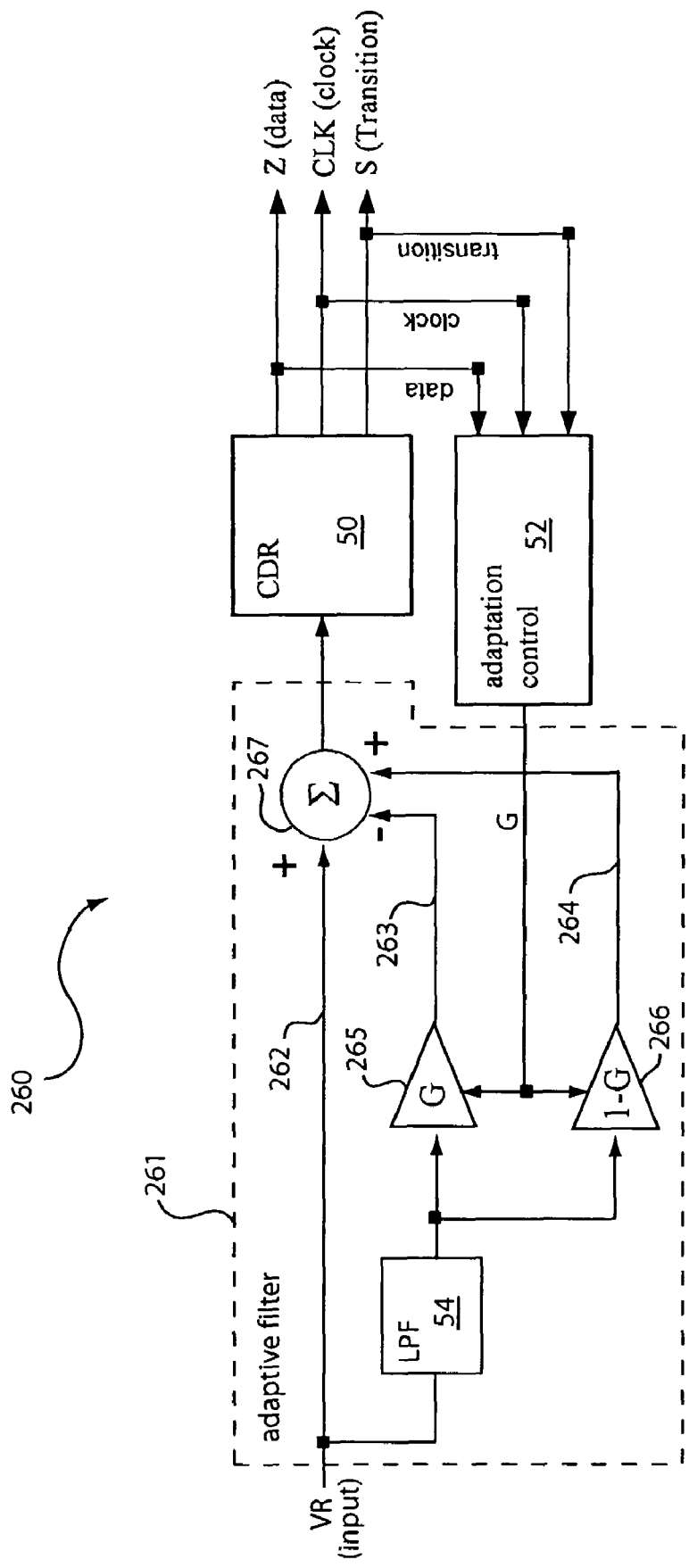
FIG. 21 illustrates a schematic diagram of a receiver in accordance with another embodiment of the present invention.

FIG. 21 illustrates a schematic diagram of a receiver 260 in accordance with another embodiment of the present invention. Receiver 260 includes an adaptive filter 261, CDR 50, and an adaptation control unit 52. Receiver 260 is similar to receiver 46 shown in FIG. 9A except for the use of adaptive filter 261 instead of adaptive filter 48. The operations of CDR 50 and adaptation control unit 52 are as previously described. Like receiver 46 of FIG. 9A, receiver 260 receives an input signal VR and outputs data signal Z and sampling clock signal CLK. The components of receiver 260 may be implemented using a variety of circuits without detracting from the merits of the present invention. Depending on implementation, differential circuits, single-ended circuits, or both may be employed.

As shown in FIG. 21, adaptive filter 261 includes a fixed gain path 262 feeding a plus input of summer 267, a high frequency boost path 263 feeding a minus input of summer 267, and a high frequency attenuate path 264 feeding another plus input of summer 267. Note that subtracting low frequency components from an input signal is essentially boosting the high frequency components of the input signal relative to the low frequency components of the input signal. Similarly, adding low frequency components to the input signal is essentially attenuating the high frequency components of the input signal relative to the low frequency components of the input signal. In the example of FIG. 21, path 263 boosts the high frequency components of the input signal relative to the low frequency components of the input signal by subtracting low frequency components from the input signal. Similarly, path 264 attenuates the high frequency components of the input signal relative to the low frequency components of the input signal by adding low frequency components to the input signal.

Still referring to FIG. 21, the input signal VR is fed to low pass filter 54, which in turn provides a low pass filtered version of the input signal VR to path 263 by way of voltage controlled gain stage 265 and to path 264 by way of voltage controlled gain stage 266. Adaptation control unit 52 provides a control signal G to both voltage controlled gain stages 265 and 266. In one embodiment, voltage controlled gain stage 265 has a gain of "G" and voltage controlled gain stage 266 has a gain of "1-G". Control signal G is varied between 0 and 1 to change the gain of voltage controlled gain stages 265 and 266. When control signal G=1, the gain through path 264 is 0 and the gain through path 263 is 1, resulting in maximum boosting of the high frequency components of the input signal VR. When G=0, the gain through path 263 is 0 and the gain through path 264 is 1, resulting in maximum attenuation of the high frequency components of the input signal VR. When control signal G is between 0 and 1 volt, voltage controlled gain stages 265 and 266 accordingly boosts and attenuates, respectively, the high frequency components of the input signal VR to achieve equalization. That is, the loop comprising adaptive filter 261, CDR 50, and adaptation control unit 52 continuously adjusts control signal G to equalize the input signal VR such that the data signal Z is an accurate representation of the originally transmitted signal VX. Path 264 advantageously allows the feedback loop to attenuate the high frequency components of the signal VR relative to the low frequency components of the signal VR in situations where the signal VR as received in the receiver 260 has boosted high frequency components, such as when pre-emphasis has been performed at the transmitter side.

Figure 22:
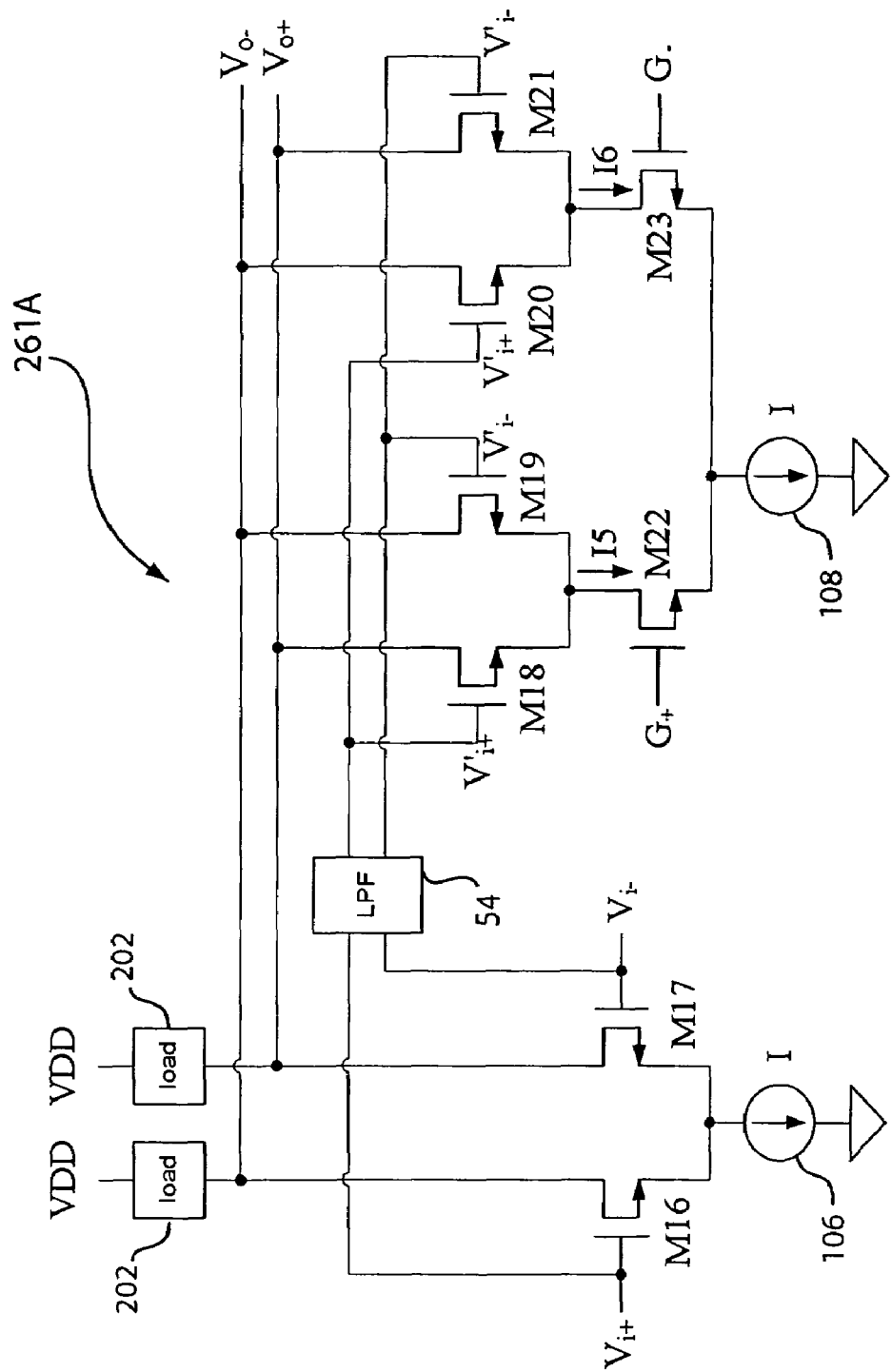
FIG. 22 illustrates a schematic diagram of an adaptive filter in accordance with another embodiment of the present invention.

FIG. 22 illustrates a schematic diagram of an adaptive filter 261A in accordance with an embodiment of the present invention. Adaptive filter 261A is a specific implementation of adaptive filter 261 of FIG. 21. In the example of FIG. 22, adaptive filter 261A accepts a differential input signal $V_i$ (e.g. differential input signal VR) consisting of voltages $V_{i+}$ and $V_{i-}$ at the gates of transistors M16 and M17, respectively. Adaptive filter 261A outputs a differential output signal $V_o$ (e.g. differential compensated signal X) consisting of voltages $V_{o+}$ and $V_{o-}$. A comparator, such as comparator 609 shown in FIG. 15B may be employed to convert the differential output signal $V_o$ to single-ended for input to a CDR 50.

Still referring to FIG. 22, current sources 106 and 108 output the same tail current I, and may be from a current mirror, for example. Loads 202 may be active or passive load devices. Transistors M16 and M17 form a differential amplifier serving as a fixed gain stage. The differential transistor pair M16-M17 provides a fixed gain path, providing the same functionality as path 262 of FIG. 21. Transistors M18 and M19 form a differential amplifier and share the same loads 202 as the differential transistor pair M16-M17. The gain of the differential transistor pair M18-M19 is variable and depends on current 15. Likewise, transistors M20 and M21 form a differential amplifier having a gain that depends on current 16. A differential control signal G, such as that generated by adaptation control unit 700 shown in FIG. 17, is used to control the splitting of the output of current source 108 into currents 15 and 16 using a differential amplifier comprising transistors M22 and M23. Control signal G thus controls the gain of the differential transistor pairs M18-M19 and M20-M21. In one embodiment, the value of control signal G is varied between 0 and 1 volt.

As shown in FIG. 22, the differential input voltages $V_{i+}$ and $V_i$ are input to the differential transistor pair M16-M17 and to low pass filter 54. Low pass filter 54 generates a low pass filtered differential input signal $V'_i$ consisting of voltages $V'_{i+}$ and $V'_{i-}$ that is amplified by the differential transistor pairs M18-M19 and M20-M21. Because of the polarity of the low pass filtered input voltages $V'_{i+}$ and $V'_{i-}$ relative to the polarity of the output voltages $V_{o+}$ and $V_{o-}$ as connected to the differential transistor pairs M18-M19 and M20-M21, differential transistor pair M18-M19 has a gain of "G" and differential transistor pair M20-M21 has a gain of "1-G". Low pass filter 54 and differential transistor pair M18-M19 thus provide a variable gain high frequency boost path, providing the same functionality as path 263 of FIG. 21. Similarly, low pass filter 54 and differential transistor pair M20-M21 provide a high frequency attenuate path, providing the same functionality as path 264 of FIG. 21.

Although the differential transistor pairs M16-M17, M18-M19, and M20-M21 share the same loads, the polarity of the output voltages $V_{o+}$ and $V_{o-}$ at the drains of the transistors are such that the output of the differential transistor pair M18-M19 will be subtracted from the output of the differential transistor pair M16-M17 and the output of the differential transistor pair M20-M21 will be added to the output of the differential transistor pair M16-M17. This effectively implements the summer 267 shown in FIG. 21. In this manner, the input signal $V_i$ is may be offset or augmented by a scaled low pass filtered version of the input signal $V_i$. The scaling factor is between 0 and 1, and depends on the differential control voltages $G_+$ and $G_-$. Adaptive filter 261 thus fully implements the adaptive filter 261 of FIG. 21, except for the fixed gain factor (instead of unity), which is not of interest as far equalization is concerned.

Improved methods and apparatus for equalizing a received input signal have been disclosed. While specific embodiments have been provided, these embodiments are for illustration purposes only and not limitations. In light of the present disclosure, many equivalent embodiments will be apparent to one of ordinary skill in the art.

We claim:

1. A communication receiver comprising:
    an adaptive filter configured to equalize an input signal to generate a compensated signal, the input signal being received over a communication channel;
    a clock and data recovery (CDR) unit configured to receive the compensated signal and generate a sampling clock signal, a data signal, and a transition signal, the transition signal comprising samples of the compensated signal taken at an edge of the sampling clock signal, the data signal comprising data recovered from the input signal; and
    an adaptation control unit configured to receive the transition signal, the data signal, and the sampling clock signal to generate a control signal, the control signal being input to the adaptive filter to control a gain of a first amplifier of the adaptive filter to allow boosting of high frequency components of the input signal relative to low frequency components of the input signal.

2. The communication receiver of claim 1 wherein the adaptation control unit comprises a charge pump.

3. The communication receiver of claim 2 wherein the charge pump comprises:
    an adaptation logic configured to generate an up signal and a down signal;
    a capacitor configured to provide the control signal;
    a first current source configured to inject charge to the capacitor based on a state of the up signal; and
    a first current sink configured to drain charge from the capacitor based on a state of the down signal.

4. The communication receiver of claim 3 further comprising:
    a second current source configured to inject charge to the capacitor based on the state of the down signal;
    a second current sink configured to drain charge from the capacitor based on the state of the up signal; and
    a common mode feedback block configured to set the common mode of the control signal.

5. The communication receiver of claim 1 wherein the first amplifier of the adaptive filter comprises a voltage controlled gain stage, the voltage controlled gain stage comprising:
    a differential amplifier; and
    a voltage controlled current source configured to bias the differential amplifier, the voltage controlled current source being configured to adjust the gain of the differential amplifier based on the control signal.

6. The communication receiver of claim 1 wherein the first amplifier of the adaptive filter comprises a voltage controlled gain stage, the voltage controlled gain stage comprising:
    a first differential amplifier configured to amplify the input signal and generate an amplified output signal; and
    a second differential amplifier configured to control a gain of the first differential amplifier by controlling a bias current of the first differential amplifier based on the control signal.

7. The communication receiver of claim 1 wherein the adaptive filter comprises:
    a first differential amplifier configured to amplify the input signal to generate a first output signal;
    a low pass filter configured to low pass filter the input signal to generate a low pass filtered input signal;
    a second differential amplifier configured to amplify the low pass filtered input signal to generate a second output signal such that the second output signal is subtracted from the first output signal to generate the compensated signal; and
    a third differential amplifier configured to change a gain of the second differential amplifier by controlling a bias current of the second differential amplifier based on the control signal.

8. The communication receiver of claim 1 wherein the control signal is input to the adaptive filter to control a gain of a second amplifier of the adaptive filter to allow attenuation of the high frequency components of the input signal relative to the low frequency components of the input signal.

9. The communication receiver of claim 1 wherein the adaptive filter comprises:
    a first differential amplifier configured to amplify the input signal to generate a first output signal;
    a low pass filter configured to low pass filter the input signal to generate a low pass filtered input signal;
    a second differential amplifier configured to amplify the low pass filtered input signal to generate a second output signal such that the second output signal is subtracted from the first output signal;
    a third differential amplifier configured to amplify the low pass filtered input signal to generate a third output signal such that the third output signal is added to the first output signal, wherein the compensated signal comprises the first output signal minus the second output signal plus the third output signal;
    a first transistor configured to control a gain of the second differential amplifier by controlling a bias current of the second differential amplifier based on a first differential voltage signal of the control signal;
    a second transistor configured to control a gain of the third differential amplifier by controlling a bias current of the third differential amplifier based on a second differential voltage signal of the control signal;
    wherein the first transistor and the second transistor form a fourth differential amplifier biased by a current source.

10. A method to be performed at a communication receiver, the method comprising:
    receiving at the communication receiver an input signal over a communication channel;
    equalizing the input signal to generate a compensated signal by boosting high frequency components of the input signal relative to low frequency components of the input signal;
    generating a data signal, a transition signal, and a sampling clock signal from the compensated signal, the data signal comprising data from the input signal, the transition signal comprising samples of the compensated signal taken at edges of the sampling clock signal;
    generating a control signal based on the data signal, the transition signal, and the sampling clock signal; and
    using the control signal to equalize the input signal and generate the compensated signal.

11. The method of claim 10 wherein the boosting the high frequency components of the input signal relative to the low frequency components of the input signal comprises:

amplifying the input signal to generate a first amplified signal;

low pass filtering the input signal to generate a low pass filtered input signal;

amplifying the low pass filtered input signal by an amount dependent on the control signal to generate a second amplified signal; and subtracting the second amplified signal from the first amplified signal to generate the compensated signal.

12. An adaptive filter for a communication receiver, the adaptive filter being configured to equalize a distorted input signal to generate a compensated signal, the adaptive filter comprising:

a first amplifier circuit configured to amplify the input signal to generate a first output signal;

a filter circuit configured to filter the input signal and generate a filtered input signal;

a second amplifier circuit configured to amplify the filtered input signal to generate a second output signal that is subtracted from the first output signal;

a third amplifier circuit configured to amplify the filtered input signal to generate a third output signal that is added to the first output signal; and a fourth amplifier circuit configured to control a gain of the second amplifier circuit and a gain of the third amplifier circuit based on a control signal;

wherein the compensated signal comprises the first output signal minus the second output signal plus the third output signal.

13. The adaptive filter of claim 12 wherein the control signal is generated at least from a data signal comprising data from the input signal, a sampling clock signal, and a transition signal comprising samples of the compensated signal taken at edges of the sampling clock signal.

14. The adaptive filter of claim 12 wherein the compensated signal is generated by a charge pump.

15. The adaptive filter of claim 12 wherein the first, second, third, and fourth amplifier circuits comprise differential amplifiers.

16. The adaptive filter of claim 12 wherein the filter circuit comprises a low pass filter.

17. A method to be performed at a communication receiver, the method comprising:

receiving at the communication receiver an input signal over a communication channel;

equalizing the input signal to generate a compensated signal by attenuating high frequency components of the input signal relative to low frequency components of the input signal;

generating a data signal, a transition signal, and a sampling clock signal from the compensated signal, the data signal comprising data from the input signal, the transition signal comprising samples of the compensated signal taken at edges of the sampling clock signal;

generating a control signal based on the data signal, the transition signal, and the sampling clock signal; and using the control signal to equalize the input signal and generate the compensated signal.

18. The method of claim 17 wherein the attenuating the high frequency components of the input signal relative to the low frequency components of the input signal comprises:

amplifying the input signal to generate a first amplified signal;

low pass filtering the input signal to generate a low pass filtered input signal;

amplifying the low pass filtered input signal by an amount dependent on the control signal to generate a second amplified signal; and adding the second amplified signal to the first amplified signal to generate the compensated signal.

19. A method to be performed at a communication receiver, the method comprising:

receiving at the communication receiver an input signal over a communication channel;

equalizing the input signal to generate a compensated signal by amplifying the input signal to generate a first amplified signal, low pass filtering the input signal to generate a low pass filtered input signal, amplifying the low pass filtered input signal by an amount dependent on a first differential voltage of a control signal to generate a second amplified signal, amplifying the low pass filtered input signal by an amount dependent on a second differential voltage of the control signal to generate a third amplified signal, and generating the compensated signal by subtracting the second amplified signal from the first amplified signal and adding the third amplified signal to the first amplified signal;

generating a data signal, a transition signal, and a sampling clock signal from the compensated signal, the data signal comprising data from the input signal, the transition signal comprising samples of the compensated signal taken at edges of the sampling clock signal;

generating the control signal based on the data signal, the transition signal, and the sampling clock signal; and using the control signal to equalize the input signal and generate the compensated signal.

* * * * *